United States Patent
Li et al.

(10) Patent No.: US 11,423,666 B2
(45) Date of Patent: Aug. 23, 2022

(54) METHOD OF DETECTING TARGET OBJECT DETECTION METHOD AND DEVICE FOR DETECTING TARGET OBJECT, ELECTRONIC APPARATUS AND STORAGE MEDIUM

(71) Applicant: Beijing Sensetime Technology Development Co., Ltd., Beijing (CN)

(72) Inventors: Bo Li, Beijing (CN); Wei Wu, Beijing (CN); Fangyi Zhang, Beijing (CN)

(73) Assignee: Beijing Sensetime Technology Development Co., Ltd., Beijing (CN)

(*) Notice: Subject to any disclaimer, the term of this patent is extended or adjusted under 35 U.S.C. 154(b) by 15 days.

(21) Appl. No.: 16/950,606

(22) Filed: Nov. 17, 2020

(65) Prior Publication Data

US 2021/0073558 A1    Mar. 11, 2021

Related U.S. Application Data

(63) Continuation of application No. PCT/CN2019/114834, filed on Oct. 31, 2019.

(30) Foreign Application Priority Data

Dec. 29, 2018   (CN) .......................... 201811635978.X

(51) Int. Cl.
*G06V 20/58* (2022.01)
*G06T 7/246* (2017.01)
(Continued)

(52) U.S. Cl.
CPC .......... *G06V 20/58* (2022.01); *G05D 1/0212* (2013.01); *G06K 9/6256* (2013.01); *G06N 3/08* (2013.01);
(Continued)

(58) Field of Classification Search
None
See application file for complete search history.

(56) References Cited

U.S. PATENT DOCUMENTS

| | | |
|---|---|---|
| 2017/0367789 A1 | 12/2017 | Fujiwara et al. |
| 2018/0137647 A1* | 5/2018 | Li .......................... G06V 20/58 |
| 2020/0265255 A1 | 8/2020 | Li et al. |

FOREIGN PATENT DOCUMENTS

| CN | 106709936 A | 5/2017 |
|---|---|---|
| CN | 106740841 A | 5/2017 |

(Continued)

OTHER PUBLICATIONS

Chinese Office Action and Search Report for Application No. 201811635978X, dated Feb. 22, 2021, 5 pages.

(Continued)

*Primary Examiner* — Leon Flores

(57) ABSTRACT

A method of detecting target object includes: extracting, through a neural network, a feature of a reference frame and a feature of a frame under detection; inputting each of at least two feature groups from at least two network layers of the neural network into a detector so as to obtain a corresponding detection result group output from the detector; wherein each feature group includes features of the reference frame and of the frame under detection, each detection result group includes a classification result and a regression result with respect to each of a plurality of candidate boxes for a feature group; and acquiring a bounding box for the target object in the frame under detection according to the at least two detection result groups.

20 Claims, 6 Drawing Sheets

Extracting a feature of a reference frame and a feature of a frame under detection through a neural network, respectively — 102

Inputting each of at least two feature groups output from at least two network layers of the neural network into a detector, and obtaining a corresponding detection result group output form the detector for each feature group — 104

Acquiring a bounding box for the target object in the frame under detection according to at least two detection result groups output from the detector for the at least two feature groups — 106

(51) Int. Cl.
*G05D 1/02* (2020.01)
*G06K 9/62* (2022.01)
*G06N 3/08* (2006.01)
*G06V 20/40* (2022.01)

(52) U.S. Cl.
CPC .............. *G06T 7/248* (2017.01); *G06V 20/49* (2022.01); *G06T 2207/10016* (2013.01); *G06T 2207/20081* (2013.01); *G06T 2207/20084* (2013.01); *G06T 2207/30261* (2013.01); *G06T 2210/12* (2013.01); *G06V 2201/07* (2022.01)

(56) References Cited

FOREIGN PATENT DOCUMENTS

| | | |
|---|---|---|
| CN | 107274433 A | 10/2017 |
| CN | 107862287 A | 3/2018 |
| CN | 107958285 A | 4/2018 |
| CN | 108200432 A | 6/2018 |
| CN | 108230353 A | 6/2018 |
| CN | 108230359 A | 6/2018 |
| CN | 108510012 A | 9/2018 |
| CN | 109284673 A | 1/2019 |
| CN | 109726683 A | 5/2019 |
| EP | 3229206 A1 | 10/2017 |
| JP | 2021524093 A | 9/2021 |

OTHER PUBLICATIONS

International Search Report for Application No. PCT/CN2019/114834, dated Jan. 7, 2020, 4 pages.
First Office Action for Chinese Application No. 201811635978.X, dated May 21, 2020, 33 pages.
Bo Li et al., "SiamRPN++: Evolution of Siamese Visual Tracking with Very Deep Networks", arXiv:1812.11703v1, Dec. 31, 2018, 10 pages.
Wei Liu et al., "SSD: Single Shot MultiBox Detector", arXiv:1512.02325v1, Dec. 8, 2015, 10 pages.
Written Opinion of the International Searching Authority Issued in International Application No. PCT/CN2019/114834, dated Jan. 7, 2020, 11 pages.
Korean Intellectual Property Office, Office Action Issued in Application No. 10-2021-7002604, dated Apr. 23, 2022, 20 pages.
Japanese Patent Office Action, Office Action Issued in Application No. 2020-563933, dated Jan. 26, 2022, 8 pages.

* cited by examiner

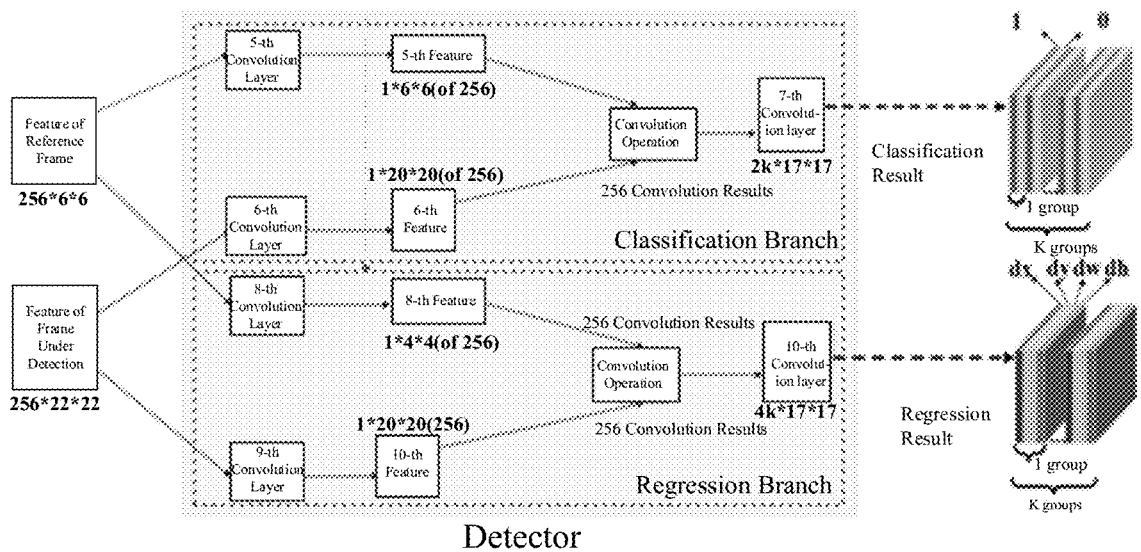

FIG. 5

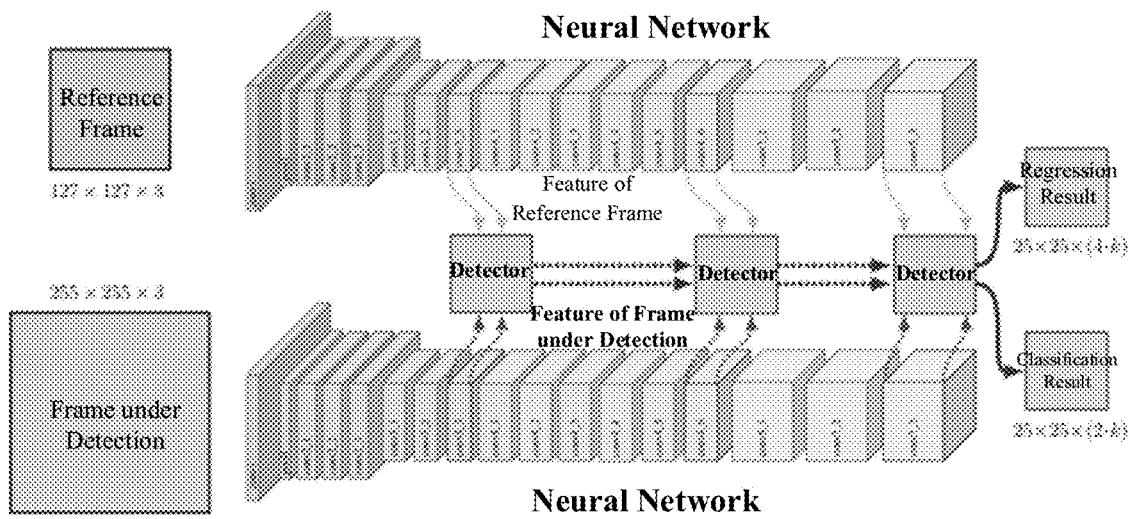

FIG. 6

| Inputting at least one sample pair a neural network, and outputting a bounding box for the target object in a frame under detection in the sample pair through the method of detecting target object according to any embodiment or any implementation or any example | 402 |

| By taking the output bounding box for the target object in the frame under detection as a predicted bounding box, Training the neural network and a detector according to the label information and the predicted bounding box | 404 |

FIG. 7

METHOD OF DETECTING TARGET OBJECT DETECTION METHOD AND DEVICE FOR DETECTING TARGET OBJECT, ELECTRONIC APPARATUS AND STORAGE MEDIUM

This application is a Continuation of a PCT international application PCT/CN2019/114834, filed on Oct. 31, 2019, which claims the priority of Chinese patent application CN201811635978.X filed with the Chinese National Intellectual Property Administration on Dec. 29, 2018 and titled "METHOD OF DETECTING TARGET OBJECT DETECTION METHOD AND DEVICE FOR DETECTING TARGET OBJECT, ELECTRONIC APPARATUS AND STORAGE MEDIUM", and contents of which is incorporated in entirety by reference.

TECHNICAL FIELD

Embodiments of the present disclosure relate to computer vision technology, and more particularly, to a method of detecting target object, a device for detecting target object, an electronic apparatus and a storage medium.

BACKGROUND

Target object detection is an important issue of computer vision, which may be applied in various tasks such as intelligent driving, single target tracking, and multi-target tracking. For example, through designating, in an image frame in a video sequence, a target object to be tracked, and detecting the target object in subsequent image frames, the target object can be located, tracked, labeled, and etc., which is of great significance in various fields, such as intellectual driving, single target tracking, and etc.

SUMMARY

Embodiments of the present disclosure provide a technical solution of detecting a target object.

In one aspect of the embodiments of the present disclosure, a method of detecting target object is provided, which includes:

extracting, through a neural network, a feature of a reference frame and a feature a frame under detection, respectively, wherein the frame under detection indicates a current frame in a video sequence in which a target object is to be detected or indicates an area image in the current frame which probably contains the target object, the reference frame indicates a bounding box image of the target object in a frame for which a bounding box for the target object is determined, a detection timing of the reference frame in the video sequence is before that of the frame under detection, and an image size of the reference frame is smaller than that of the frame under detection;

inputting each of at least two feature groups output from at least two network layers of the neural network into a detector so as to obtain a corresponding detection result group output from the detector; wherein each feature group includes a feature of the reference frame and a feature of the frame under detection, and each detection result group includes a classification result and a regression result with respect to a plurality of candidate boxes for the target object; and determining a bounding box for the target object in the frame under detection according to the at least two detection result groups output from the detector for the at least two feature groups.

Another aspect of the embodiments of the present disclosure provides a method of training target object detection network, including:

inputting at least one sample pair into a neural network, wherein each of the at least one sample pair includes a reference frame and a frame under detection which correspond to each other, and outputting a bounding box for the target object in the frame under detection by using the method of detecting target object according to the above embodiment;

taking the output bounding box for the target object in the frame under detection as a predicted bounding box, and training the neural network and the detector according to label information in the frame under detection and the predicted bounding box.

In yet another aspect of the embodiments of the present disclosure, a device for detecting target object is provided, including:

a neural network, configured to extract a feature of a reference frame and a feature of a frame under detection, respectively; wherein the frame under detection indicates a current frame in a video sequence in which a target object is to be detected or indicates an area image in the current frame which probably contains a target object, the reference frame indicates a bounding box image of the target object in a frame for which a bounding box for the target object is determined, a detection timing of the reference frame in the video sequence is before that of the frame under detection, and an image size of the reference frame is smaller than that of the frame under detection;

a detector, configured to receive each of at least two feature groups output from at least two network layers of the neural network, and to output a detection result group for each feature group; wherein each feature group include the feature of the reference frame and the feature of the frame under detection, and each detection result group includes a classification result and a regression result with respect to each of a plurality of candidate boxes for the target object; and an acquiring module, configured to determine a bounding box for the target object in the frame under detection according to at least two detection result groups output from the detector for the at least two feature groups.

In another aspect of the embodiments of the present disclosure, a device for training target object detection network is provided, including:

a target object detection network, configured to receive at least one sample pair, each of the at least one sample pair including a reference frame and a frame under detection which correspond to each other, and to output a bounding box for the target object in the frame under detection of the sample pair, wherein the target object detection network includes the device for detecting target object according to any of the above embodiments;

a training module, configured to take the bounding box for the target object in the frame under detection as a predicted bounding box, and to train the neural network and the detector according to label information of the frame under detection and the predicted bounding box.

Based on the method of detecting target object and the device for detecting target object, the electronic apparatus and the storage medium according to the embodiments of the present disclosure, a feature of the reference frame and a feature of the frame under detection are extracted through the neural network, respectively, at least two feature groups output from at least two network layers of the neural network are input into the detector so as to obtain at least two detection result groups, and the bounding box for the target object in the frame under detection is acquired according to the at least two detection result groups. In the embodiments of the present disclosure, the neural network with at least two network layers is introduced to extract features from the reference frame and the frame under detection, and to perform target object detection respectively based on the at least two feature groups output from the at least two network layers. Due to the different receptive fields of different network layers, comprehensive information extraction of the image frame can be achieved in detail and globally, a bounding box for the target object in the frame under detection is acquired according to the detection result obtained by synthesizing the features output from various network layers, such that the result with respect to target object detection is more accurate and more precise. The bounding box for the target object is acquired according to the classification result and the regression result with respect to each of the plurality of candidate boxes in the frame under detection, such that changes in position and changes in size of the target object can be estimated better, thus the position of the bounding box for the target object in the frame under detection can be found more precisely, thereby improving the speed and accuracy of target tracking, with good tracking effect and fast speed.

Based on the method of training target object detection network and the device for training target object detection network, the electronic apparatus, and the storage medium according to the above-mentioned embodiments of the present disclosure, in a case that the trained target object detection network is configured to detect a target object, the detection results obtained by combining the features output from different network layers are used to acquire the bounding box for the target object in the frame under detection, making the result with respect to the target object detection more accurate and more precise; the bounding box for the target object is obtained according to the classification result and the regression result with respect to each of the plurality of candidate boxes in the frame under detection, thus the change in position and the change in size of the target object can be estimated better, and the position of the target object in the frame under detection can be found more accurately, thereby improving the speed and accuracy of target tracking, with good tracking effect and fast speed.

The technical solutions of the present disclosure will be further described in detail hereinafter through the accompanying drawings and embodiments.

BRIEF DESCRIPTION OF THE DRAWINGS

The drawings constituting a part of the specification describe the embodiments of the present disclosure, and serve to explain the principle of the present disclosure along with the specification.

With reference to the accompanying drawings, the present disclosure can be understood more clearly according to the following detailed description, wherein:

FIG. 5 is another schematic diagram of a detector for the embodiment according to the present disclosure as illustrated in FIG. 4.

FIG. 6 is a diagram of an application example of the embodiment as illustrated in FIG. 4.

FIG. 7 is a flowchart of a method of training target object detection network according to an embodiment of the present disclosure.

DETAILED DESCRIPTION OF THE EMBODIMENTS

Figure 1:
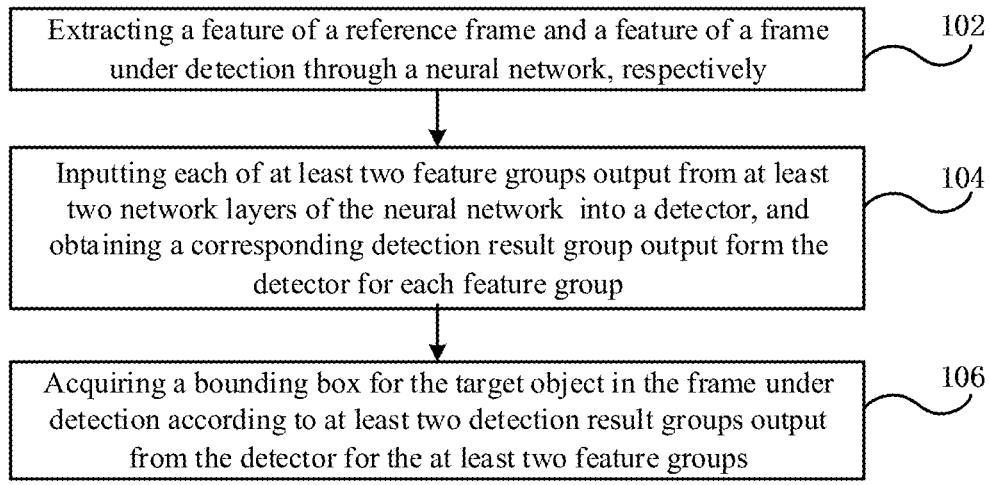
FIG. 1 is a flowchart of a method of detecting target object according to an embodiment of the present disclosure.

Various exemplary embodiments of the present disclosure will now be described in detail with reference to the accompanying drawings. It should be noted that, relative arrangements of components and steps, numerical expressions and numerical values set forth in these embodiments cannot be construed to be a limit to the scope of the present disclosure, unless specifically stated otherwise.

And meanwhile, it should be understood that, for ease of description, sizes of various parts illustrated in the drawings are not drawn in accordance with actual scales.

The following description of the embodiments is only illustrative, and should not be construed as a limit to the present disclosure or its application or usage in any manner.

Techniques, methods, and equipment known to one of ordinary skill in the relevant arts may not be discussed in detail, and if appropriately, the techniques, the methods, and the equipment should be considered as part of the specification.

It should be noted that similar reference signs and letters in the following drawings indicate similar items, therefore, once an item is defined in one drawing, it does not need to be further discussed in subsequent drawings.

The embodiments of the present disclosure may be applicable to a computer system/a server, which can be operated with various other general-purpose or special-purpose computing system environment or configuration. Examples of well-known computer system, environment and/or configuration suitable to be operated with the computer system/server include, but are not limited to: a personal computer system, a server computer system, a thin client, a thick client, a handheld device or a laptop device, a microprocessor-based system, a set-top box, a programmable consumer electronic device, a network personal computer, a small computer system, a large computer system, and a distributed cloud computing technology environments including any of the above systems, and etc.

The computer system/server may be described in the typical context of computer system executable instructions (such as a program module) executed by the computer system. Typically, a program module may include a routine, a program, an object program, a component, logic, data structures, etc., which perform a specific task or implement a specific abstract data type. The computer system/server can be implemented in a distributed cloud computing environment, in which a task is executed by a remote processing device linked through communication networks. In a distributed cloud computing environment, a program module may be located on storage media of a local or remote computing system which includes a storage device.

FIG. 1 is a flowchart of a method of detecting target object according to an embodiment of the present disclosure. As illustrated in FIG. 1, the method of detecting target object according to the embodiment includes:

102. A feature of a reference frame and a feature of a frame under detection are extracted, respectively, through a neural network.

An image size of the reference frame is smaller than that of the frame under detection.

In the embodiments of the present disclosure, the frame under detection indicates a current frame which is to be subjected to target object detection, or indicates an area image in the current frame which probably contains a target object. In a case that the frame under detection is an area image in the current frame which probably contains the target object, the current frame is to be subjected to target object detection, in an embodiment of the present disclosure, the area image has an image size greater than the reference frame. For example, a searching area with a size of 2-4 times the image size of the reference frame, centered at a center point of the reference frame image, is taken as the frame under detection.

In the embodiment of the present disclosure, the reference frame indicates a bounding box image of the target object in a frame for which a bounding box for the target object is determined, a detection timing of the reference frame in the video sequence is before that of the frame under detection. The reference frame may be a starting frame in the video sequence that requires target tracking. The starting frame may be positioned flexibly in the video sequence. For example, the starting frame may be the first frame or any intermediate frame in the video sequence. The frame under detection is a frame that requires target tracking. After the bounding box for the target object is determined in the frame under detection, an image corresponding to the bounding box for the target object in the frame under detection can be taken as a reference frame for a next frame under detection.

In a method of detecting target object according to another embodiment of the present disclosure, in a case that a frame under detection is an area image in the current frame which probably contains a target object, the current frame is to be subjected to target object detection, the method may further include: cutting the area image from the current frame as the frame under detection, wherein at least one of a length and a width of the area image is greater than that of the reference frame, and the area image is centered at a center point of the reference frame.

In an embodiment of the present disclosure, in the operation 102, the feature of the reference frame and the feature of the frame under detection may be extracted through a single neural network, respectively; or, the feature of the reference frame and the feature of the frame under detection may be extracted through different neural networks with same structure, respectively.

In the embodiment of the present disclosure, the feature may be a feature vector or a feature graph, however, the embodiment of the present disclosure is not limited thereto.

The neural network in the embodiments of the present disclosure can be implemented by any deep neural network with a plurality of network layers, such as a convolution neural network, a recurrent neural network, etc., for example, LeNet, AlexNet, GoogLeNet, VGGNet, ResNet, MobileNet (such as ResNet-18, ResNet-34, ResNet-50, ResNet-101, and etc.), ShuffleNet and any other types of neural networks.

In an optional example, the operation 102 may be implemented through calling a corresponding instruction stored in a memory by a processor, or may be implemented by a neural network run by a processor.

104. Each of at least two feature groups output from at least two network layers in the neural network is input into a detector, and a corresponding detection result group output form the detector is obtained, and thus, at least two detection result groups are obtained for the at least two feature groups.

Each feature group includes a feature of the reference frame and a feature of the frame under detection, and each detection result group includes a classification result and a regression result with respect to each of a plurality of candidate boxes for the target object corresponding to a feature group.

The classification result includes a probability value that each candidate box is the bounding box for the target object, and the regression result includes a position offset of each candidate box with respect to the bounding box in the reference frame.

The detector according to the embodiment of the present disclosure may classify the input feature group of the reference frame and the frame under detection so as to determine a probability value that each candidate box is the bounding box for the target object; and perform regression processing on the input feature group of the reference frame and the frame under detection, so as to determine a position offset of each candidate box with respect to the bounding box in the reference frame, thereby obtaining the classification result and the regression result with respect to each of the plurality of candidate boxes for the bounding box for the target object. The input feature group may be a feature graph of the reference frame along with a feature graph of the frame under detection.

For example, in an optional embodiment, the plurality of candidate boxes may include K candidate boxes at different positions in the frame under detection, wherein K is a preset integer greater than 1. The aspect ratios of the K candidate boxes are different from each other. For example, the aspect ratio of the K candidate boxes may include: 1:1, 2:1, 2:1, 3:1, 1:3 and etc. The classification result is to indicate the probability value that the respective K candidate box at different position is the bounding box for the target object.

The value of K and the aspect ratios of the K candidate boxes can be configured through a pre-training process. In this way, after receiving the input feature group of the reference frame and the frame under detection, a classification processing is performed on the feature of the reference frame and the feature of the frame under detection, a probability value that each of the K candidate boxes at various positions in the frame under detection is a bounding box for the target object is determined, respectively, according to the feature of the reference frame and the feature of the frame under detection, and a regression processing is performed on the feature of the reference frame and the feature of the frame under detection, and a position offset of each of the K candidate boxes at various positions with respect to the bounding box in the reference frame, thus, the classification result and the regression result with respect to each of the plurality of candidate boxes as the bounding box for the target object can be obtained. In this way, for a group of reference frame and frame under detection, after a feature group of the reference frame and the frame under detection are extracted, respectively, by a neural network, and are input into a detector, a classification result and a regression result with respect to each of a plurality of candidate boxes in the frame under detection that are possibly determined as the bounding box for the target object, which are output from the detector, can be obtained. The detector only needs to have functions of classification and regression detection, and it can be constituted by a unit for classification processing and a unit for regression processing, and its specific implementation is not limited in the present disclosure. And further, possible implementations of the detector will be described in following embodiments of the present disclosure (for example, FIG. 3, FIG. 5, FIG. 9 and FIG. 10). However, one of ordinary skill in the art knows that the description in the present disclosure only describes the exemplary implementation of the detector, and the specific implementation of the detector is not limited to this.

In an optional example, this step S104 may be performed through calling a corresponding instruction stored in a memory by a processor, or may be performed by a detector run by the processor.

106. a bounding box for the target object in the frame under detection is acquired according to at least two detection result groups output from the detector for the at least two feature groups.

In an optional example, step S106 may be performed through calling a corresponding instruction stored in a memory by a processor, or may be performed by an acquisition module run by the processor.

Based on the method of detecting target object according to the embodiments of the present disclosure as discussed above, a neural network with multiple network layers is introduced to perform feature extraction on the reference frame and the frame under detection, and the target object detection is performed based on at least two feature groups output from at least two network layers. Due to the different receptive fields of different network layers, comprehensive information extraction of the image frame can be achieved in detail and globally, a bounding box for the target object in the frame under detection is acquired according to the detection result obtained by synthesizing the features output from various network layers, such that the result with respect to target object detection is more accurate and more precise. The bounding box for the target object is acquired according to the classification result and the regression result with respect to each of the plurality of candidate boxes in the frame under detection, such that changes in position and changes in size of the target object can be estimated better, thus the position of the target object in the frame under detection can be found more precisely, thereby improving the speed and accuracy of target tracking, with good tracking effect and fast speed.

In a method of detecting target object according to yet another embodiment of the present disclosure, it may further include: taking the bounding box image of the target object in the frame under detection as a next reference frame, and extracting a feature of the next reference frame and a feature of a next frame under detection through the neural network respectively, wherein a timing of the next frame under detection in the video sequence is after that of the frame under detection; inputting each of at least two feature groups output from at least two network layers of the neural network into a detector so as to obtain a corresponding detection result group output from the detector, wherein each detection result group corresponds to a feature group; wherein each feature group includes the feature of the next reference frame and the feature of the next frame under detection; acquiring a bounding box for the target object in the next frame under detection according to the at least two detection result groups output from the detector for the at least two feature groups.

Based on the above embodiment, an image of the bounding box for the target object in the frame under detection is taken as a reference frame for a next frame under detection, such that target object detection can be performed successively on the frames under detection located after the reference frame in timing sequence of the video sequence. Thereby, the bounding boxes for the target object can be determined in a plurality of frames in a video sequence, and target object tracking in the video sequence can be achieved.

In an embodiment of the present disclosure, the neural network includes a plurality of convolution layers, and may be a deep neural network including a plurality of convolution layers. Correspondingly, in the operation 104, each of the at least two feature groups output from the at least two convolution layers of the neural network may be input to the detector. In this embodiment, the network layer of the neural network that outputs each feature group is a convolution layer.

Alternatively, in another embodiment of the present disclosure, the neural network includes a plurality of convolution blocks, each of which includes at least one convolution layer, and the neural network may be a deep neural network including a plurality of convolution blocks. And correspondingly, in the operation 104, at least two feature groups output from at least two convolution blocks of the neural network may be input into the detector, respectively. In this embodiment, the network layer of the neural network that outputs each feature group is a convolution block, for example, it may be the last convolution layer of the convolution block (that is, the deepest convolution layer of the neural network).

Alternatively, in another embodiment of the present disclosure, the neural network includes at least one convolution block and at least one convolution layer, and each of the at least one convolution block includes at least one convolution layer, that is, the neural network may be a deep neural network including at least one convolution block and at least one convolution layer. And correspondingly, in the operation 104, at least two feature groups output from at least one convolution block and from at least one convolution layer of the neural network may be input into the detector, respectively. In this embodiment, the network layer of the neural network that outputs at least two feature groups includes at least one convolution block and at least one convolution layer. In a case that the network layer that outputs a feature group is a convolution block, for example, it may be the last convolution layer (that is, the deepest convolution layer of the neural network) to output the feature group.

In an embodiment of the present disclosure, inputting a feature group output from a network layer of the neural network into the detector so as to obtain a detection result group output from the detector can be implemented in the following manner: obtaining a classification weight for the detector and a regression weight for the detector based on the feature of the reference frame; processing the feature of the frame under detection with the classification weight and the regression weight, respectively, so as to obtain a classification result and a regression result with respect to each of multiple candidate boxes output from the detector.

Figure 2:
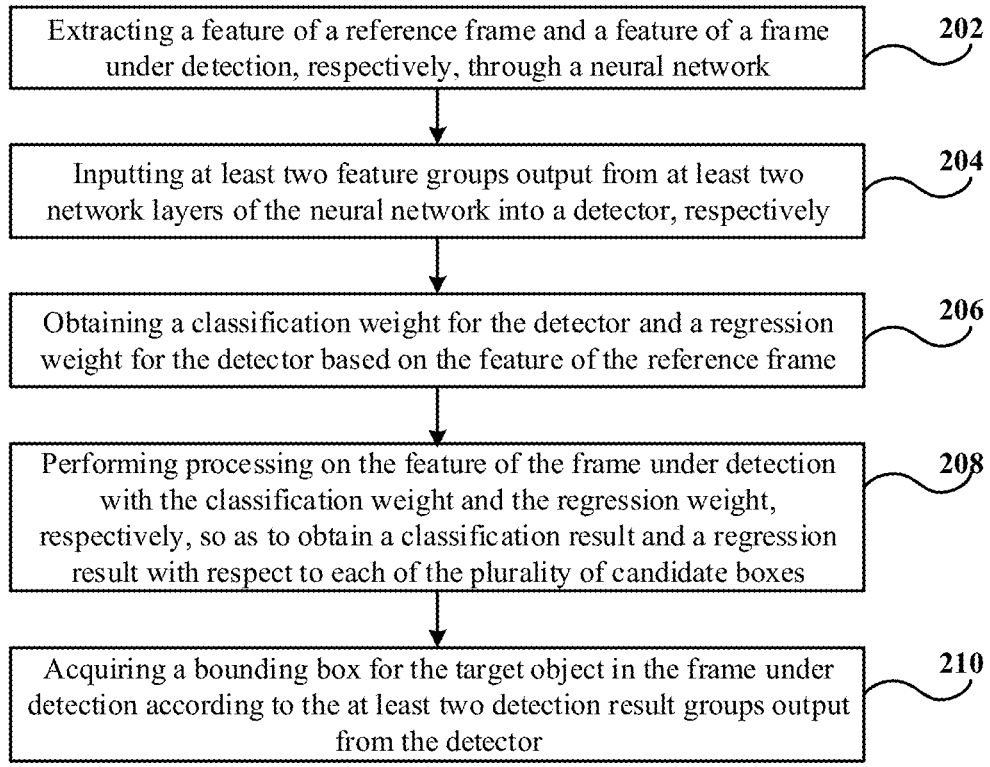
FIG. 2 is a flowchart of a method of detecting target object according to another embodiment of the present disclosure.

As illustrated in FIG. 2, it is a flowchart of a method of detecting target object according to another embodiment of the present disclosure. The method of detecting target object includes:

202: a feature of a reference frame and a feature of a frame under detection are extracted, respectively, through a neural network.

204: at least two feature groups output from at least two network layers of the neural network are input into a detector, respectively.

The detector performs the operations 206-208 for each feature group, respectively, and obtains a corresponding detection result group, wherein each detection result group includes a classification result and a regression result with respect to each of a plurality of candidate boxes.

206: a classification weight for the detector and a regression weight for the detector are obtained based on the feature of the reference frame.

208: processing is performed on the feature of the frame under detection with the classification weight and the regression weight, respectively, so as to obtain a classification result and a regression result with respect to each of the plurality of candidate boxes.

With the operations 206-208, at least two detection result groups are obtained, and then operation 210 is performed on the at least two detection result groups.

210. a bounding box for the target object in the frame under detection is acquired according to the at least two detection result groups output from the detector.

In this embodiment, based on the reference frame, the detector can quickly generate a plurality of candidate boxes from the frame under detection, and obtain an offset of each of the plurality of candidate boxes at various positions in the frame under detection with respect to the bounding text for the target object in the reference frame, thus change in position and change in size of the target object can be estimated better, and position of the target object in the frame under detection can be determined more precisely, thereby improving the speed and accuracy of target tracking, with good tracking effect and fast speed.

In some embodiments of the present disclosure, in the operation 206, convolution operation is performed, through the first convolution layer, on the feature of the reference frame, and a first feature obtained by the convolution operation is taken as the classification weight for the detector.

For example, in an optional example, the classification weight for the detector can be obtained through the following manner: a convolution operation is performed, through the first convolution layer, on the feature of the reference frame, and then, the number of channels of the feature of the reference frame is increased, so as to obtain the first feature, wherein the number of channels of the first feature is 2K times the number of channels of the feature of the reference frame.

In a case that the number of channels of the first feature is 2K times the number of channels of the feature of the reference frame, the classification result may include a probability value that the respective K candidate box at various positions in the frame under detection is the bounding box for the target box.

In some embodiments, in the operation 206, convolution operation may be performed, through the second convolution layer, on the feature of the reference frame, and a second feature obtained through the convolution operation is taken as a regression weight for the detector.

For example, in an optional example, the regression weight for the detector may be obtained through the following manner: a convolution operation may be performed, through a second convolution layer, on the feature of the reference frame, and the number of channels of the feature of the reference frame is increased, so as to obtain the second feature, wherein the number of channels of the second feature is 4K times the number of channels of the feature of the reference frame.

The regression result includes an offset of each of the K candidate boxes at various positions in the frame under detection with respect to the bounding box for the target object in the reference frame. The offset may include change in position and change in size, and the position may be a position of the center point or positions of the four vertices of the reference frame.

In a case that the number of channels of the second feature is 4K times the number of channels of the feature of the reference frame, the offset of each candidate box with respect to the bounding box for the target object in the reference frame may include, for example, an offset in the abscissa of the center point (dx), an offset in the ordinate of the center point (dy), change in the height (dh), and change in the width (dw).

In some embodiments of the present disclosure, in the operation 208, convolution operation may be performed, with the classification weight, on the feature of the frame under detection, so as to obtain a classification result with respect to each of the plurality of candidate boxes; and convolution operation may be performed, with the regression weight, on the feature of the frame under detection, so as to obtain a regression result with respect to each of the plurality of candidate boxes.

For example, in some optional embodiments, in a case that convolution operation is performed, with the classification weight, on the feature of the frame under detection so as to obtain the classification result with respect to the plurality of candidate boxes, the convolution operation may be performed, through a third convolution layer of the detector, on the feature of the frame under detection so as to obtain a third feature, the number of channels of which is identical to the number of channels of the feature of the frame under detection. And the convolution operation is performed on the third feature with the classification weight, so as to obtain a classification result with respect to each of the plurality of candidate boxes.

For another example, in some optional embodiments, in a case that the convolution operation is performed, with the regression weight, on the feature of the frame under detection so as to obtain the regression result with respect to each of the plurality of candidate boxes, the convolution operation may be performed, through a fourth convolution layer of the detector, on the feature of the frame under detection so as to obtain a fourth feature, the number of channels of which is identical to the number of channels of the feature of the frame under detection; the convolution operation is performed, with the regression weight, on the fourth feature so as to obtain a regression result with respect to each of the plurality of candidate boxes.

Figure 3:
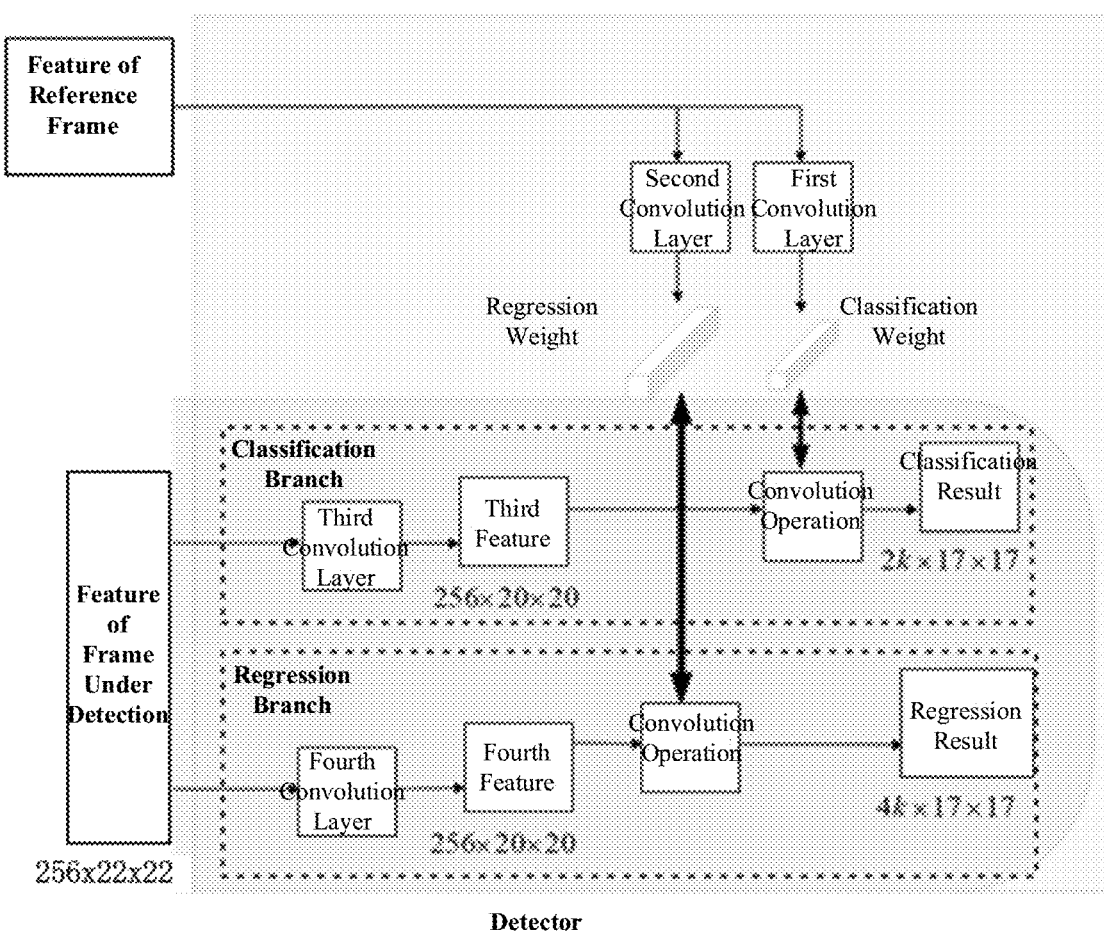
FIG. 3 is a schematic diagram of a detector according to an embodiment of the disclosure.

As illustrated in FIG. 3, it is a schematic diagram of a detector corresponding to the embodiment of the present disclosure as discussed above.

In addition, in some other embodiments of the present disclosure, in the operation 206, in a case that the classification weight for the detector is obtained based on the feature of the reference frame, convolution operation may be performed, through a fifth convolution layer, on the feature of the reference frame, and L fifth features obtained through the convolution operation is taken as a classification result with respect to the detector. Where, the number of channels of the feature of the reference frame is M1, the number of channels of the fifth feature is N1, each of M1, N1, and L is an integer greater than 0, and M1 is greater than N1. For example, in an optional embodiment, the number of channels of the feature of the reference frame is 256, and convolution operation is performed, through the fifth convolution layer, on the feature of the reference frame, and then 256 fifth features with 1 channel are obtained.

In some embodiments, in the operation 208, in a case that the feature of the frame under detection is processed with the classification weight so as to obtain a classification result with respect to each of the plurality of candidate boxes, convolution operation may be performed, through a sixth convolution layer of the detector, on the feature of the frame under detection so as to obtain L sixth feature with channels of N1, wherein the number of channels of the feature of the frame under detection is M2 which is an integer greater than zero and greater than N1. Convolution operation is performed, with each of the L fifth features of the classification weight, on a corresponding feature of the L sixth features (that is, convolution operation is performed, through the t-th fifth feature, on the t-th sixth feature, t is an integer greater than zero and less than 256) so as to obtain L conventional results; convolution operation is performed, through a seventh convolution layer of the detector, on the L conventional results, so as to obtain a classification result with respect to each of the plurality of candidate boxes. For example, in an optional embodiment, the number of channels of the feature of the frame under detection is 256, and convolution operation is performed, through the sixth convolution layer, on the feature of the reference frame so as to obtain 256 sixth feature with 1 channel, and convolution operation is performed, through each feature of the 256 fifth features of the classification result, on a corresponding feature of the 256 sixth features, so as to obtain 256 convolution results.

Optionally, in the foregoing embodiment, after obtaining the L convolution results, the L convolution results can further be connected, and convolution operation is performed, through a seventh convolution layer of the detector, on the connected L convolution results.

In some embodiments, in the operation 206, in a case that the regression weight for the detector is obtained through the feature of the reference frame, convolution operation may be performed, through the eighth convolution layer, on the feature of the reference frame, and an eighth feature with P channels, obtained through the convolution operation, is taken as the regression weight for the detector. The number of channels of the feature of the reference frame is M1, the number of channels of the eighth feature is N2, each of M1, N2, and P is an integer greater than 0, and M1 is greater than N2. For example, in one optional embodiment, the number of channels of the feature of the frame under detection is 256, and convolution operation is performed, through the eighth convolution layer, on the feature of the reference frame, thus, 256 eighth features with 1 channel is obtained.

In some embodiments, in the operation 208, in a case that the feature of the frame under detection is processed with the regression weight so as to obtain a regression result with respect to each of the plurality of candidate boxes output from the detector, convolution operation is performed, through a ninth convolution layer of the detector, on the feature of the frame under detection so as to obtain P ninth features with N2 channels; wherein the number of channels of the feature of the frame under detection is M2, which is an integer greater than 0 and greater than N2; convolution operation is performed respectively, through each feature of the P eighth features, on a corresponding feature of the P ninth features (that is, convolution operation is performed, through the t-th eighth feature, on t-th ninth feature, where t is an integer greater than 0 and less than 256), so as to obtain P convolution results; and convolution operation is performed, through a tenth convolution layer of the detector, on the P convolution results, so as to obtain a regression result with respect to each of the plurality of candidate boxes. N1 may be identical to N2, or may be different from N2. For example, in an optional embodiment, the number of channels of the feature of the frame under detection is 256, and convolution operation is performed, through the ninth convolution layer, on the feature of the reference frame, so as to obtain 256 ninth features with 1 channel Convolution operation is performed, through each feature of the 256 eighth features of the regression result, on a corresponding feature of the tenth features, so as to obtain 256 convolution results.

In an optional embodiment, after obtaining P convolution results, the P convolution results can be connected, and convolution operation may be performed, through the tenth convolution layer of the detector, on the connected P convolution results.

Figure 4:
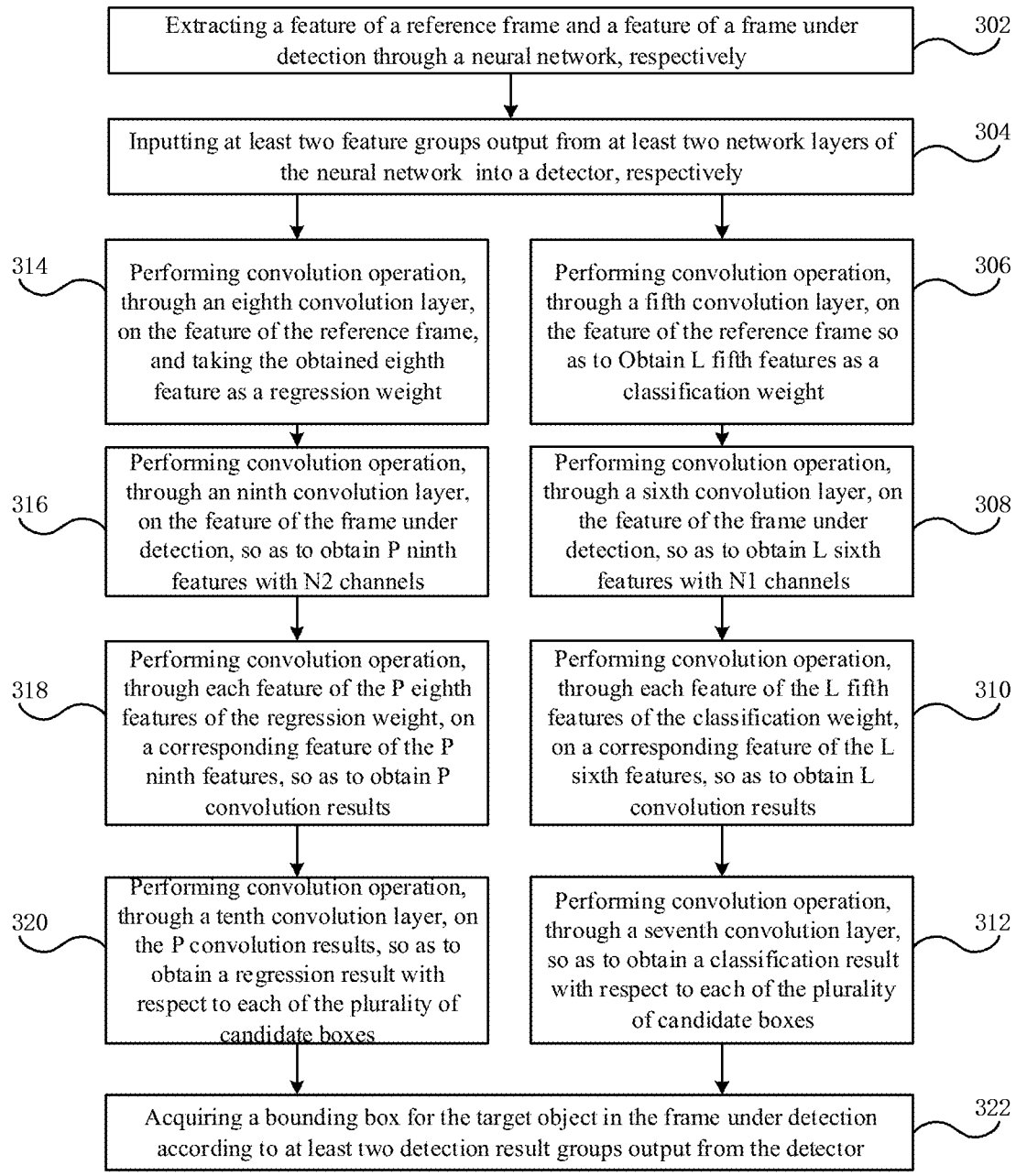
FIG. 4 is a flowchart of a method of detecting target object according to an embodiment of the present disclosure.

FIG. 4 is a flowchart of the disclosure corresponding to the above-mentioned embodiment. FIG. 5 is a schematic diagram of the detector corresponding to the embodiment illustrated in FIG. 4 in the present disclosure. Referring to FIG. 4 and FIG. 5, the method of detecting target object according to the embodiment comprises:

302: a feature of a reference frame and a feature of a frame under detection are extracted through a neural network, respectively.

304: at least two feature groups output from at least two network layers of the neural network are input into a detector, respectively.

The detector performs operations 306-312 and 314-320 for each input feature group so as to obtain a corresponding detection result group. Each detection result group includes: a classification result and a regression result with respect to each of a plurality of candidate boxes.

306: Convolution operation is performed, through a fifth convolution layer of the detector, on the feature of the reference frame and L fifth features obtained through the convolution operation is taken as a classification weight for the detector.

The number of channels of the feature of the reference frame is M1, the number of channels of the fifth feature is N1, each of M1, N1, and L is an integer greater than 0, and M1 is greater than N1. That is, the number of channels of the feature of the reference frame is reduced through the operation 306.

308: Convolution operation is performed, through a sixth convolution layer of the detector, on the feature of the frame under detection, so as to obtain L sixth features with N1 channels.

The number of channels of the feature of the frame under detection is M2, which is an integer greater than 0, and greater than N1. That is, the number of channels of the feature of the frame under detection is reduced through the operation 308.

310: Convolution operation is performed, through each feature of the L fifth features of the classification weight, on a corresponding feature of the L sixth features, so as to obtain L convolution results.

312: Convolution operation is performed, through a seventh convolution layer of the detector, so as to obtain a classification result with respect to each of the plurality of candidate boxes.

And then, operation 322 is performed.

314. Convolution operation is performed, through an eighth convolution layer of the detector, on the feature of the reference frame, and an eighth feature with the P channels obtained through the convolution operation is taken as a regression weight for the detector.

The number of channels of the feature of the reference frame is M1, the number of channels of the eighth feature is N2, each of M1, N2, and P is an integer greater than 0, and M1 is greater than N2. That is, the number of channels of the feature of the reference frame is reduced through the operation 314.

316: Convolution operation is performed, through an ninth convolution layer of the detector, on the feature of the frame under detection, so as to obtain P ninth features with N2 channels.

The number of channels of the feature of the frame under detection is M2, which is an integer greater than 0 and greater than N2. That is, the number of channels of the feature of the frame under detection is reduced through the operation 316.

318: Convolution operation is performed, through each feature of the P eighth features of the regression weight, on a corresponding feature of the P ninth features, so as to obtain P convolution results.

320: Convolution operation is performed, through a tenth convolution layer of the detector, on the P convolution results, so as to obtain a regression result with respect to each of the plurality of candidate boxes.

The above operations 306-312 and the above operations 314-320 are operations of two branches. The operations of these two branches may be executed at the same time, or in any order, or with any time difference, which is not limited in the embodiment.

At least two detection result groups are obtained through the operations 306-320, and then operation 322 is performed on the at least two detection result groups.

322: a bounding box for the target object in the frame under detection is acquired according to at least two detection result groups output from the detector.

Based on the above embodiment, the feature of the reference frame and the feature of the frame under detection in the same group can be converted into features with the same number of channels and fewer channels, and then relevant operations are performed on the feature graph of the reference frame and the feature graph of the frame under detection, for example, the feature graph of the reference frame with 256 channels and the feature graph of the frame under detection with 256 channels may be converted into 256 feature graphs with 1 channel, respectively, and 256 feature graphs are obtained through relevant operations. That is, more channels are provided, and are converted into the classification result and the regression result with respect to each of 2 k channels or 4 k channels, through relevant operations and subsequent convolution operations. As it is not necessary to increase a dimension of the reference frame, an amount of parameters can be significantly reduced, thereby improving calculation speed.

It should be noted that the convolution layers and the convolution units mentioned in the embodiments of the present disclosure, such as the first convolution layer, the second convolution layer, . . . , the tenth convolution layer in the above embodiments, for example, may be a single convolution layer or a convolution layer formed by stacking multiple convolution layers, which is not limited in the embodiments of the present disclosure.

In addition, in some implementations of the foregoing embodiments, in the operations 106, 210, or 322, obtaining the bounding box for the target object in the frame under detection according to the at least two detection result groups output from the detector, may be achieved through the following manner:

The classification results of the at least two detection result groups are weighted, averaged, or weight-averaged, so as to obtain a comprehensive classification result with respect to the plurality of candidate boxes; and/or the regression results of at least two detection result groups are weighted, averaged, or weight-averaged, so as to obtain a comprehensive regression result with respect to the plurality of candidate boxes; and A bounding box for the target object in the frame under detection is obtained according to the comprehensive classification result with respect to the plurality of candidate boxes and the comprehensive regression result with respect to the plurality of candidate boxes.

For example, representation of the classification result and the regression result is a vector, including a plurality of components. For example, the classification result includes two components, which respectively correspond to a probability value that a candidate box is a bounding box for the target object. The regression result includes four components, which respectively corresponds to the offset of a candidate box with respect to the bounding box for the target object in the reference frame (the offset in the abscissa of the center point dx, the offset of the ordinate of the center point dy, change in the height dh, and change in the width dw). Then, in a case that the classification results of at least two detection result groups are weighted (multiplied), each component of the respective classification results may be weighted (multiplied) with a preset weighting coefficient for each detection result group. And then, corresponding components of the obtained at least two classification results are summed so as to obtain a comprehensive classification result. And in a case that the regression results of at least two detection result groups are weighted, each component of the respective regression results may be weighted (multiplied) with a preset weighting coefficient for each detection result group. And then, corresponding components of the obtained at least two regression results are summed so as to obtain a comprehensive regression result. In order to obtain the bounding box for the target object in the frame under detection accurately and rapidly according to the comprehensive classification result and the comprehensive regression result with respect to the plurality of candidate boxes, the sum of the weighting coefficients for at least two detection result groups may be set to 1.

Similarly, in a case that the classification results of at least two detection result groups are averaged, corresponding components of the classification result vectors of the at least two detection result groups can be summed and then averaged so as to obtain a comprehensive classification result. When the regression results of at least two detection result groups are weighted, the corresponding components of the regression result vectors of the at least two detection result groups can be summed and then averaged so as to obtain a comprehensive regression result.

Similarly, in a case that the classification results of at least two detection result groups are weighted, corresponding component of each classification result are weighted (multiplied) with a preset weighting coefficient for each detection result group, and corresponding components of the obtained at least two classification result vectors are summed and then averaged so as to obtain a comprehensive classification result. In a case that the regression results of at least two detection result groups are weighted and averaged, each component of respective classification results are weighted (multiplied) with a preset weighting coefficient for each detection result group, and then, corresponding components of the obtained at least two regression result vectors are summed and averaged so as to obtain a comprehensive regression result.

It should be noted that in addition to the manner of weighting, averaging or weighted-averaging the classification results and the regression results with respect to at least two detection result groups so as to obtain the comprehensive classification result and the comprehensive regression result with respect to the plurality of candidate boxes, the classification results and the regression results of the at least two detection result groups can further be processed through other manners, such as summation, wherein the classification results and the regression results of at least two detection result groups are processed, respectively, so as to obtain a comprehensive classification result and a comprehensive regression result with respect to the plurality of candidate boxes, which is not limited in the embodiments of the present disclosure.

For example, in some optional embodiments, one candidate box can be selected from the plurality of candidate boxes based on the comprehensive classification result and the comprehensive regression result with respect to the plurality of candidate boxes, and regression processing is performed on the selected candidate box based on an offset of the comprehensive regression result with respect to the selected candidate box, so as to obtain a bounding box for the target object in the frame under detection.

Optionally, in a possible implementation, in a case that a candidate box is selected from the plurality of candidate boxes, the candidate box may be selected from the plurality of candidate boxes according to weight coefficients of the comprehensive classification result and the comprehensive regression result. For example, according to the weight coefficients of the comprehensive classification result and the comprehensive regression result, a comprehensive score is calculated based a probability value and an offset of each candidate box, and the candidate box is selected from the plurality of candidate boxes according to the comprehensive scores of the plurality of candidate boxes, for example, the candidate box with highest comprehensive score is selected.

Optionally, in another possible implementation, after obtaining the comprehensive regression result with respect to the plurality of candidate boxes, the comprehensive classification result may be adjusted according to the comprehensive regression result with respect to the plurality of candidate boxes. In a case that a candidate box is selected from the plurality of candidate boxes, the candidate box is selected from the plurality of candidate boxes according to the adjusted comprehensive classification result.

For example, after obtaining the comprehensive regression result with respect to the plurality of candidate boxes, the probability values of the candidate boxes can be adjusted according to an amount of change in position and an amount of change in size of the comprehensive regression result with respect to the candidate boxes, for example, according to the amount of change in position and the amount of change in size in the comprehensive regression result, the probability values of the candidate boxes are adjusted. For example, the probability value of the candidate box with a large change in position (that is, a large position movement) or a large change in size (that is, a large change in shape) is reduced. Correspondingly, in this example, in a case of selecting the candidate box from the plurality of candidate boxes according to the comprehensive classification result and the comprehensive regression result, the candidate box with the highest probability value can be selected from the plurality of candidate boxes according to the adjusted probability values.

In an optional embodiment of the method of detecting target object according to the present disclosure, after obtaining the comprehensive classification result and the comprehensive regression result with respect to the plurality of candidate boxes, the classification result can further be normalized to ensure that the sum of the probability values that each candidate boxes is the bounding box for the target object is 1, which helps to determine whether each candidate box is the bounding box for the target object.

FIG. 6 illustrates an application example diagram corresponding to the method as illustrated in FIG. 4. In this application embodiment, an example is illustrated in which three feature groups output from three network blocks of a neural network (ResNet-50) are input into the detector so as to obtain three detection result groups output from the detector. Among the features output from the neural network, different sizes represent different resolutions. The deeper the network layer (the farther to the right), the deeper the feature (the larger the number of channels), and the smaller the spatial size. The lines drawn from features of different sizes indicate that the feature is input into the detector. Based on the records of the embodiments of the present disclosure, one of ordinary skill in the art can learn that a plurality of feature groups output from a plurality of network blocks of the neural network are input into the detector so as to obtain a plurality of detection result groups, which will not be elaborated here. In the foregoing embodiments of the present disclosure, the target object may include, but is not limited to, any one or more of the following: pedestrians, vehicles, robots, animals, aircrafts, movable stationary objects, and any other objects.

After acquiring the bounding box for the target object according to the foregoing embodiments of the present disclosure, various applications, such as target tracking, intelligent driving control, and security, can be performed on the basis of the bounding box for the target object. For example, in an application scenario, after acquiring the bounding box for the target object in the frame under detection, the bounding box for the target object in the video sequence can be marked, so that the target object in the video sequence can be labeled.

For another example, in an application scenario, after acquiring the bounding box for the target object in multiple frames of the video sequence, a movement trajectory of the target object in the video sequence can be determined according to positions of the bounding boxes for the target object in the multiple frames in the video sequence, so that the movement trajectory of the target object can be learned.

For another example, in an application scenario, after acquiring bounding boxes for the target object in multiple frames in a video sequence, shooting parameters of a camera can be adjusted according to positions of the bounding boxes for the target object, so that the target object can be automatically focused on by the camera.

For another example, in an application scenario, after acquiring the bounding box for the target object in the frame under detection, it can be determined whether the position of the bounding box for the target object in the frame under detection is within a preset area; in response to a position of the bounding box for the target object within the preset area, prompt messages are output, so as to realize early warning of the target object's exiting and entry into the specific area. For another example, in an application scenario, in a case that there are a plurality of target objects, after acquiring bounding boxes for the plurality of target objects in the frame under detection, the plurality of target objects in the frame under detection can be matched with the bounding boxes for the plurality of target objects in the reference frame. According to matching results and respective identification of the plurality of target objects in the reference frame, the respective identification of the plurality of target objects are labeled, thus labeling the plurality of target objects is achieved.

For another example, in an application scenario, in a case that there are a plurality of target objects, after acquiring bounding boxes for the plurality of target objects in multiple frames in the video sequence, movement trajectory of each of the plurality of target objects in the video sequence may be determined according to positions of the bounding box for each of the plurality of target objects in multiple frames in the video sequence, and each of the plurality of target objects may be tracked according to the movement trajectory of each of the plurality of target objects in the video sequence.

For another example, in an application scenario, in a case that there are a plurality of target objects, after acquiring the bounding boxes for the plurality of target objects in multiple frames of the video sequence, behaviors of the plurality of target objects can be analyzed according to change in the number or change in positions of the plurality of target objects in the multiple frames of the video sequence, thereby achieving analysis and application on the behaviors of the plurality of target object.

For another example, in an application scenario, after acquiring the bounding boxes for the target object in multiple frames of the video sequence, a motion state of the target object may be determined according to positions of the bounding boxes for the target object in the multiple frames of the video sequence; and according to the motion state of the target object and a motion state of a carrier which carries a camera that shoots the video sequence, an intelligent driving control is performed on the carrier, thereby achieving intelligent driving control based on the target object.

The carrier may include, but is not limited to, vehicles, robots, or aircrafts, and any other movable objects.

In an optional embodiment, performing intelligent driving control on the carrier may be, for example, planning a route for the carrier, and/or controlling the motion state or driving mode of the carrier.

FIG. 7 is a flowchart of a method of training target object detection network according to an embodiment of the present disclosure. As illustrated in FIG. 7, the method of training target object detection network according to this embodiment includes:

402. at least one sample pair is input into a neural network, and by using the method of detecting target object according to any embodiment or any implementation or any example, a bounding box for the target object in a frame under detection in the sample pair is output.

Each sample pair includes a reference frame and a frame under detection that correspond to each other, and positions of the bounding boxes for the target object in different frames under detection are different. Each frame is provided with label information in advance, which may include a position of the bounding box for the target object in the frame under detection.

404: by taking the output bounding box for the target object in the frame under detection as a predicted bounding box, the neural network and a detector are trained according to the label information and the predicted bounding box, that is, parameters of the neural network and the detector are adjusted.

The above operations 402-404 may be performed iteratively to meet preset training completion condition, for example, the difference between the label information of the frame under detection and the predicted bounding box being less than a preset threshold, or the number of training reaching the preset number.

Regarding portions of the embodiments of the method of training target object detection network according to the present disclosure related to the foregoing embodiments of the method of detecting target object, please refer to the records of the foregoing embodiments, which will not be elaborated here.

Based on the method of training target object detection network according to the above-mentioned embodiments of the present disclosure, in a case that a target object detection network obtained through training is applied to detect a target object, the detection results obtained by combining the features output from different network layers are used to obtain the bounding box for the target object in the frame under detection, making the detection result with respect to the target object more accurate and more precise; the bounding box for the target object is obtained according to the classification result and the regression result with respect to each of a plurality of candidate boxes of the frame under detection, thus change in position and change in size of the target object can be estimated better, and the position of the target object in the frame under detection can be found more precisely, thereby improving the speed and accuracy of target tracking, with good tracking effect and fast speed.

In the process of implementing the present disclosure, the inventor discovered that, in order to keep a size of output feature graph unchanged during convolution, the existing deep neural network introduces padding, that is, 0 is added, for filling, to the outermost part of the feature graph output from an upper layer, which destroys the strict translation of the neural network without deformation.

To solve the above problem, in some embodiments of the present disclosure, the position of the bounding box for the target object in the at least one sample pair is randomly distributed, or evenly distributed with a preset offset.

In this way, in the training process of the target object detection network, the target object can be located at any position in the image, instead of being fixed at the center of the image, so that the target object in the input image loses its position prior, thus the neural network can eliminate this prior, and predict the correct target object position, thereby taking advantage of a structure of the deep neural network.

For example, in some possible embodiments, in order to make the position of the bounding box for the target object evenly distributed with a preset offset, a sample pair can be obtained first, which comprises a reference frame and a frame under detection. At this time, the target object is located at the image center of the frame under detection; two offsets are sampled from [−s/2, +s/2] with uniform probability, where s is the image size of the frame under detection; then, the target object is moved according to the offset, that is, making the target object appear uniformly in the image of the frame under detection, instead of being at the image center of the frame under detection all the time, and meanwhile calculating the actual position of the target object after the offset for supervision (namely label information).

Any method of detecting target object according to the embodiments of the present disclosure can be performed by any suitable device with data processing capabilities, including but not limited to: terminal devices, servers and etc. Alternatively, any method of detecting target object according to the embodiment of the present disclosure may be performed by a processor, for example, the processor executes any method of detecting target object according to the embodiment of the present disclosure through calling a corresponding instruction stored in a memory. And it will not be elaborated hereinafter.

One of ordinary skill in the art can understand that all or part of the steps in the above method embodiments can be implemented by program instruction related hardware. The program can be stored in a computer readable storage medium. When the program is executed, the steps of the method embodiment are executed. The storage medium includes: ROM, RAM, magnetic disk, or optical disk and other media that can store program codes.

Figure 8:
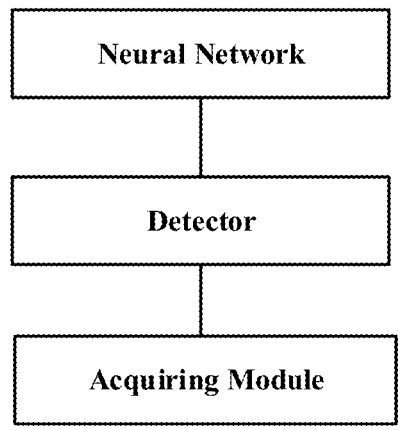
FIG. 8 is a schematic structural diagram of a device for detecting target object according to an embodiment of the present disclosure.

FIG. 8 is a schematic structural diagram of a device for detecting target object according to an embodiment of the present disclosure. The device for detecting target object according to this embodiment can be used to implement the method of detecting target object according to the embodiments of the present disclosure. As illustrated in FIG. 8, the device for detecting target object according to this embodiment includes a neural network, a detector, and an acquisition module.

The neural network is configured to extract a feature of a reference frame and a feature of a frame under detection respectively. The frame under detection indicates a current frame in the video sequence which is to be subjected to target object detection, or indicates an area image in the current frame that probably contains a target object, and the reference frame is a bounding box image of the target object in a frame for which a bounding box for the target object is determined, a detection timing of the reference frame in the video sequence is before that of the frame under detection. The image size of the reference frame is smaller than that of the frame under detection.

The detector is configured to receive each of at least two feature groups output from at least two network layers of the neural network, and to output a detection result group for each feature group; wherein each feature group includes a feature of the reference frame and a feature of the frame under detection, and each detection result group includes a classification result and a regression result with respect to each of a plurality of candidate boxes for the target object.

The acquiring module is configured to determine a bounding box for the target object in the frame under detection according to the at least two detection result groups output from the detector for the at least two feature groups.

Based on the device for detecting target object according to the above-mentioned embodiments of the present disclosure, the detection results obtained by combining the features output from different network layers are used to obtain the bounding box for the target object in the frame under detection, making the detection result with respect to the target object more accurate and more precise; the bounding box for the target object is obtained according to the classification result and the regression result with respect to each of a plurality of candidate boxes in the frame under detection, thus the change in position and the change in size of the target object can be estimated better, and the position of the target object in the frame under detection can be found more accurately, thereby improving the speed and accuracy of target tracking, with good tracking effect and fast speed.

In one implementation of various embodiments of the present disclosure, the neural network may include a plurality of convolution layers. And correspondingly, the detector is configured to respectively receive at least two feature groups output from at least two convolution layers of the neural network.

Alternatively, in another implementation manner of various embodiments of the present disclosure, the neural network may include a plurality of convolution blocks, and each convolution block includes at least one convolution layer. And correspondingly, the detector is configured to respectively receive at least two feature groups output from at least two convolution blocks of the neural network.

Or, in yet another implementation manner of various embodiment of the present disclosure, the neural network includes at least one convolution block and at least one convolution layer, and each of the at least one convolution block includes at least one convolution layer; and the detector is configured, from the at least one convolution block and the at least one convolution layer of the neural network, respectively, to receive at least two feature groups.

In addition, in the foregoing embodiment, in a case that the frame under detection is an area image that probably contain the target object in the current frame which is to be subjected to target objection detection, the device for detecting target object further includes: a selecting module, configured to cut an area image from the current frame as the frame under detection, wherein at least one of a length and a width of the area image is greater than that of the reference frame, and the area image is centered at a center point of the reference frame.

In one implementation of various embodiment of the present disclosure, the detector is configured to obtain a classification weight for the detector and a regression weight for the detector based on the features of the reference frame; process the feature of the frame under detection, with the classification weight for the detector and the regression weight for the detector, respectively, so as to obtain a classification result and a regression weight with respect to each a plurality of candidate boxes.

Figure 9:
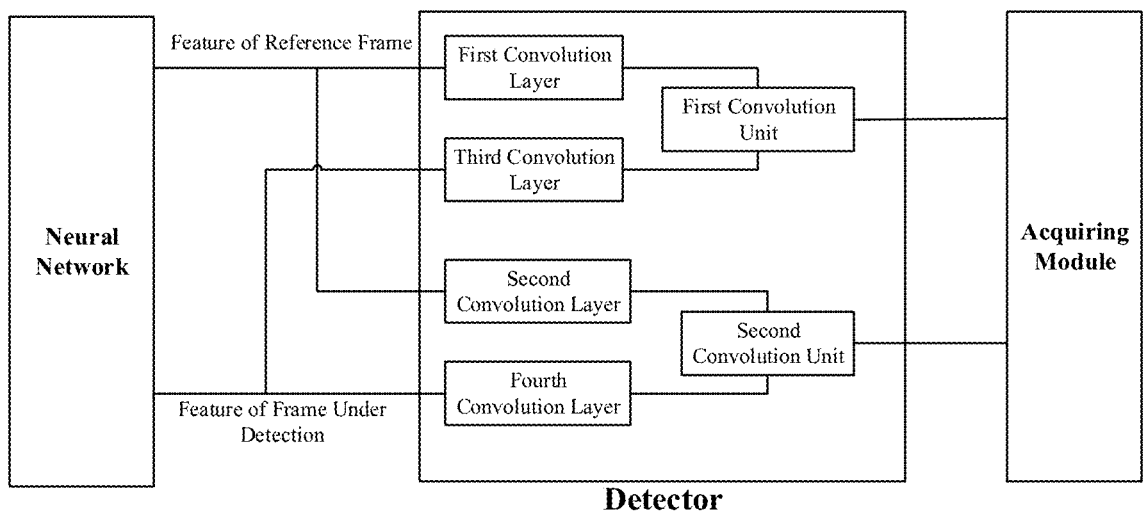
FIG. 9 is a schematic structural diagram of the device for detecting target object according to another embodiment of the present disclosure.

FIG. 9 is a schematic structural diagram of the device for detecting target object according to another embodiment of the present disclosure. As illustrated in FIG. 9, in an implementation of the present disclosure, the detector may include: a first convolution layer, configured to perform convolution operation on the feature of the reference frame, and to take a first feature obtained through the convolution operation as a classification weight for the detector; a second convolution layer, configured to perform convolution operation on the feature of the reference frame, and to take a second feature obtained through the convolution operation as a regression weight for the detector; a third convolution layer, configured to perform convolution operation on the feature of the frame under detection so as to obtain a third feature, the number of channels of which is identical to the number of channels of the feature of the frame under detection; a first convolution unit, configured to perform, with the classification weight, convolution operations on the third feature so as to obtain a classification result with respect to each of the plurality of candidate boxes; a fourth convolution layer, configured to perform convolution operations on the feature of the frame under detection so as to obtain a fourth feature, the number of channels of which is identical to the number of channels of the feature of the frame under detection; and a second convolution unit, configured to perform, with the regression weight, convolution operation on the fourth feature so as to obtain a regression result with respect to each of the plurality of candidate boxes.

Figure 10:
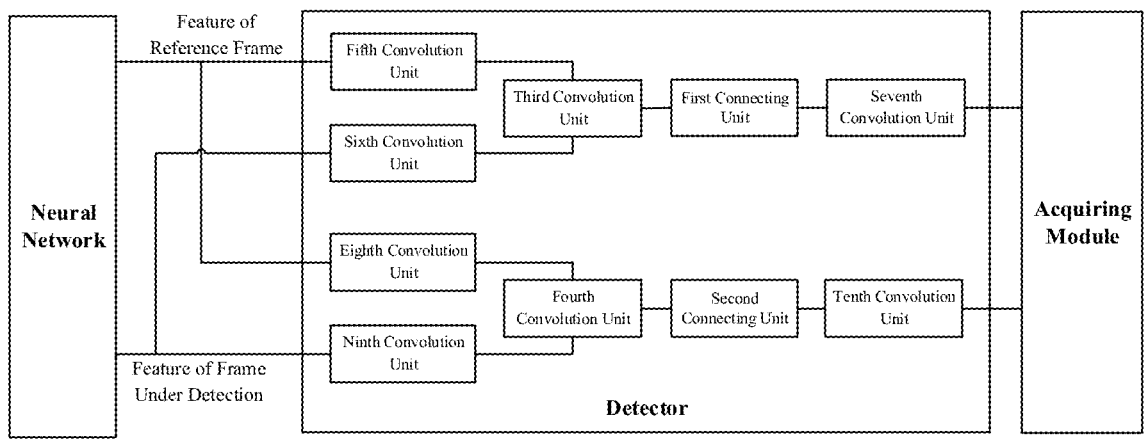
FIG. 10 is a schematic structural diagram of the device for detecting target object according to still another embodiment of the present disclosure.

FIG. 10 is a schematic structural diagram of the device for detecting target object according to another embodiment of the present disclosure. As illustrated in FIG. 10, in another implementation, the detector may comprise: a fifth convolution layer, configured to perform convolution operation on the feature of the reference frame, and to take L fifth features obtained through the convolution operation as a classification weight for the detector, wherein the number of channels of the feature of the reference frame is M1, the number of channels of the fifth feature is N1, each of M1, N1, and L is an integer greater than 0, and M1 is greater than N1; a sixth convolution layer, configured to perform convolution on the feature of the frame under detection, so as to obtain L sixth features with N channels, wherein the number of channels of the feature of the frame under detection is M2, which is an integer greater than 0 and is greater than N1; a third convolution unit, configured to perform, with each feature of the L fifth features of the classification weight, convolution operation on a corresponding feature of the L sixth features, so as to obtain L convolution results; a seventh convolution layer, configured to perform convolution operation on the L convolution results, so as to obtain a classification result with respect to each of the plurality of candidate boxes; an eighth convolution layer, configured to perform convolution operation on the feature of the reference frame, and to take an eighth feature with P channels obtained through the convolution operation as a regression weight for the detector; wherein the number of channels of the feature of the reference frame is M1, the number of channels of the feature of the eighth feature is N2, each of N2 and P is an integer greater than 0, and M1 is greater than N2; a ninth convolution layer, configured to perform convolution operation on the feature of the frame under detection, so as to obtain P ninth features with N2 channels, wherein the number of channels of the feature of the frame under detection is M2, which is an integer greater than 0 and is greater than N2; a fourth convolution unit, configured to perform, with each feature of the P eighth features of the regression weight, on a corresponding feature of the P ninth features, so as to obtain P convolution results; and a tenth convolution layer, configured to perform convolution operation on the P convolution results so as to obtain a regression result with respect to each of the plurality of candidate boxes.

Optionally, referring to FIG. 10 again, in another implementation, the detector may further include: a first connecting unit, configured to connect the L convolution results. And correspondingly, the seventh convolution layer is configured to perform convolution operation on the connected L convolution results.

Optionally, referring to FIG. 10 again, in still another implementation, the detector may further include: a second connecting unit, configured to connect the P convolution results. And correspondingly, the tenth convolution layer is configured to perform convolution operation on the connected P convolution results.

In an implementation of various embodiments of the present disclosure, the acquiring module may include: a comprehensive processing unit, configured to perform one of weighting, averaging, or weighted-averaging on the classification results of the at least two detection result groups so as to obtain a comprehensive classification result with respect to the plurality of candidate boxes; and to perform one of weighting, averaging or weighted-averaging on the regression results of the at least two detection result groups so as to obtain a comprehensive regression result with respect to the plurality of candidate boxes; and an acquiring unit configured to acquire a bounding box for the target object in the frame under detection according to the comprehensive classification result with respect to the plurality of candidate boxes and the comprehensive regression result with respect to the plurality of candidate boxes.

In some of the optional examples, the acquiring unit is configured to select a candidate box from the plurality of candidate boxes according to the comprehensive classification result with respect to the plurality of candidate boxes and the comprehensive regression result with respect to the plurality of candidate boxes, and perform regression on the selected candidate box according to an offset of the comprehensive regression result with respect to the selected candidate box, so as to obtain a bounding box for the target object in the frame under detection.

In a possible implementation, in a case that the acquiring unit selects a candidate box from the plurality of candidate boxes according to the comprehensive classification result with respect to the multiple candidate boxes and the comprehensive regression result with respect to the multiple candidate boxes, the acquiring unit may be configured to select a candidate box from the plurality of candidate boxes according to a weight coefficient for the comprehensive classification result and a weight coefficient for the comprehensive regression result.

In another possible implementation, the acquiring module may further include: an adjusting unit, configured to adjust the comprehensive classification result with respect to the plurality of candidate boxes according to the comprehensive regression result with respect to the plurality of candidate boxes. And correspondingly, the acquiring unit is configured to select a candidate box from the plurality of candidate boxes according to the adjusted comprehensive classification result.

In the embodiments of the present disclosure as discusses above, the target object may include, but is not limited to, any one or more of the following: pedestrians, vehicles, robots, animals, aircrafts, movable stationary objects, and so on.

In addition, the device for detecting target object according to the embodiments of the present disclosure further includes: an application unit, configured to:

label, after acquiring the bounding box for the target object in the frame under detection, the bounding box for the target object in the video sequence; and/or, determine, after acquiring the bounding boxes for the target object in multiple frames in the video sequence, a movement trajectory of the target object in the video sequence according to the positions of the bounding boxes for the target object in the multiple frames in the video sequence; and/or, adjust, after acquiring the bounding boxes for the target object in multiple frames in the video sequence, shooting parameters of a camera according to the position of the bounding box for the target object in the multiple frames in the video sequence; and/or, determine, after acquiring the bounding box for the target object in the frame under detection, whether a position of the bounding box for the target object in the frame under detection is within a preset area; and output a prompt message in response to a position of the bounding box for the target object within the preset area; and/or, match, in a case that there are a plurality of target objects, after acquiring the bounding boxes for the plurality of target objects in the frame under detection, the plurality of target objects in the frame under detection with the bounding boxes for the plurality of target objects in the reference frame, and label identification for each of the plurality of target objects in the frame under detection according to a matching result and the identification of each of the plurality of target object in the reference frame; and/or, determine, in a case that there are a plurality of target objects, after acquiring the bounding boxes for the plurality of target objects in multiple frames in the video sequence, movement trajectory of the plurality of target objects in the video sequence according to positions of the bounding boxes for each of the plurality of target objects in the multiple frames in the video sequence; and track the plurality of target objects according to the movement trajectory of the plurality of target objects in the video sequence; and/or, analyze, in a case that there are a plurality of target objects, after acquiring the bounding boxes for the plurality of target objects in multiple frames in the video sequence, behaviors of the plurality of target objects according to changes in the number and/or position of the plurality of target objects in multiple frames in the video sequence; and/or, determine, after acquiring the bounding boxes for the target object in multiple frames in the video sequence, motion state of the target object according to positions of the bounding box for the target object in the multiple frames in the video sequence, and, perform intelligent driving control on a carrier on which a camera shooting the video sequence is carried based on the motion state of the target object and motion state of the carrier.

The carrier may include, but is not limited to, any movable objects such as vehicles, robots, or aircrafts; or, in a case that the application unit performs intelligent driving control on the carrier, the application unit is configured to plan the route for the carrier and/or to control the movement state of the carrier or the driving mode of the carrier.

Regarding operation process, configuration manner, and corresponding technical effects of any device for detecting target object according to the embodiments of the present disclosure, reference may be made to the specific description of the above corresponding method embodiments of the present disclosure, it is not elaborated here for saving space.

Figure 11:
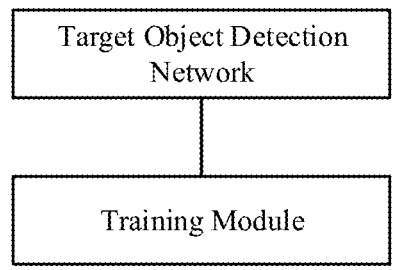
FIG. 11 is a schematic structural diagram of a device for training a target object detection network according to an embodiment of the present disclosure.

FIG. 11 is a schematic structural diagram of an embodiment of a device for training target object detection network according to an embodiment of the present disclosure. The device for training target object detection network according to this embodiment can be applicable to implement the above-mentioned methods of training target object detection network according to the embodiments of the present disclosure. As illustrated in FIG. 11, the device for training target object detection network according to this embodiment includes: a target object detection network, configured to receive at least one sample pair, and output a bounding box for the target object in a frame under detection; wherein each sample pair includes a reference frame and a frame under detection which correspond to each other; the target object detection network includes the device for detecting target object according to any of the above embodiments; a training module, configured to take the output bounding box for the target object in the frame under detection as a predicted bounding box, and to train a neural network and a detector according to label information in the frame under detection and the predicted bounding box.

Based on the device for training target object detection network according to the embodiments of the present disclosure, in a case that the trained target object detection network is configured to detect a target object, the detection results obtained by combining the features output from different network layers are used to acquire the bounding box for the target object in the frame under detection, making the detection result with respect to the target object more accurate and more precise; the bounding box for the target object is obtained according to the classification result and the regression results with respect to a plurality of candidate boxes of the frame under detection, thus change in position and change in size of the target object can be estimated better, and the position of the target object in the frame under detection can be found more accurately, thereby improving the speed and accuracy of target tracking, with good tracking effect and fast speed.

For the operation process, configuration manner, and corresponding technical effects of the device for training target object detection network according to the embodiments of the present disclosure, please refer to the specific description of the above corresponding method embodiments of the present disclosure, and it will not be elaborated here for saving space.

In an implementation of the present disclosure, positions of the bounding boxes for target object in the at least two different frames under detection described above are different.

In another implementation of the present disclosure, positions of the bounding box for the target object in the at least one sample pair are randomly distributed, or evenly distributed with a preset offset.

In addition, at least one embodiment of the present disclosure further provides an electronic device, which may include the device for detecting target object according to any embodiment of the present disclosure or the device for training target object detection network according to any embodiment of the present disclosure. Optionally, the electronic device may be a terminal device or a server, for example.

At least one embodiment of the present disclosure further provides an electronic apparatus, including:

a memory, configured to store executable instructions; and a processor, configured to communicate with the memory to execute the executable instructions so as to implement the method of detecting target object according to the embodiments of the present disclosure, or the method of training target object detection network according to the embodiments of the present disclosure.

Figure 12:
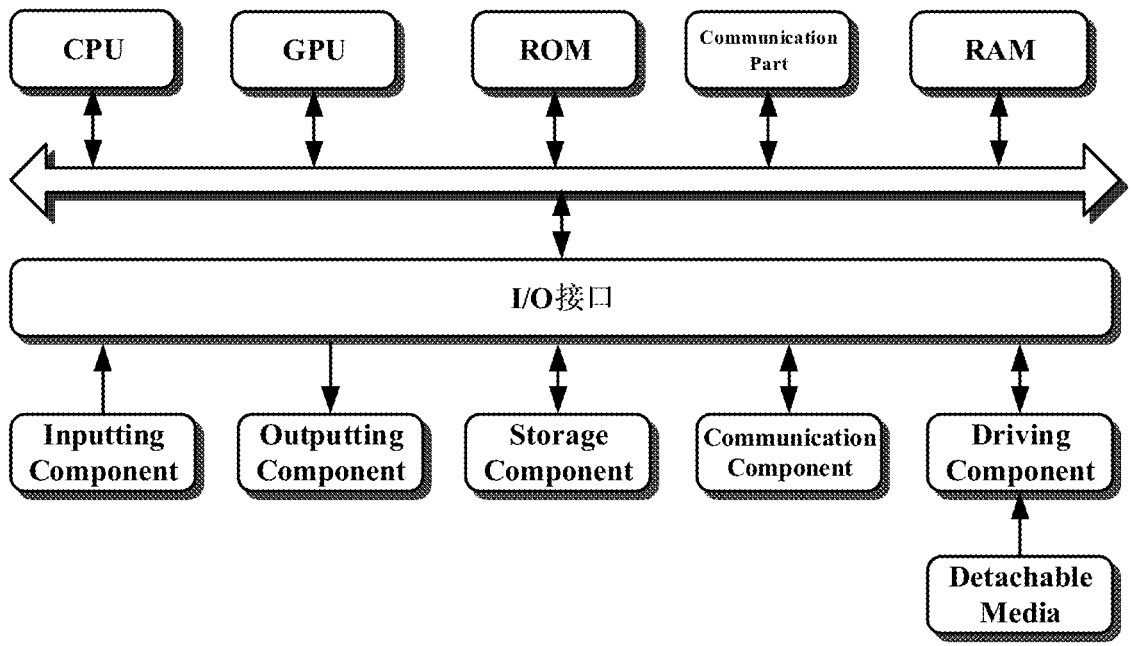
FIG. 12 is a schematic structural diagram of an application embodiment of the electronic apparatus according to the disclosure.

FIG. 12 is a schematic structural diagram of an electronic apparatus according to an embodiment of the present disclosure. Reference is now made to FIG. 12, which illustrates a schematic structural diagram of an electronic apparatus suitable for implementing the terminal device or the server according to the embodiments of the present disclosure. As illustrated in FIG. 12, the electronic apparatus includes one or more processors, a communication component, etc. The one or more processors include one or more central processing units (CPU), and/or one or more images Processor (GPU), and etc. Each of the one or more processors can perform various appropriate actions and processing according to executable instructions stored in read-only memory (ROM) or executable instructions loaded from storage to random access memory (RAM). The communication component may include but not limited to a network card, which may include but is not limited to an IB (Infiniband) network card. The processor can communicate with a read-only memory and/or a random access memory to execute executable instructions, and is connected to the communication component via a bus, and communicate with other target devices via the communication component, so as to complete the operation corresponding to any method of detecting target object according to the embodiments of the present disclosure, for example, extracting, through a neural network, the feature of the reference frame and the feature of the frame under detection, respectively, wherein the frame under detection indicates a current frame in the video sequence, which is to be subjected to target object detection, or indicates an area image in the current frame that probably contains a target object, and the reference frame is a bounding box image of the target object in a frame for which a bounding box for the target object is determined, a detection timing of the reference frame in the video sequence is before that of the frame under detection. The image size of the reference frame is smaller than that of the frame under detection; inputting each of the at least two feature groups output from at least two network layers of the neural network into a detector, so as to obtain a corresponding detection result group output from the detector; wherein, each feature group includes a feature of the reference frame and a feature of the frame under detection, and each detection result group includes a classification result and a regression result with respect to each of the plurality of the candidate boxes for the target object; and acquiring a bounding box for the target object in the frame under detection according to at least two detection result groups output from the detector for the at least two feature groups.

Alternatively, the processor may communicate with a read-only memory and/or a random access memory to execute executable instructions, and be connected to the communication component via a bus, and communicate with other target devices via the communication component, thereby completing any method of training target object detection network according to the embodiments of the present disclosure, for example, inputting at least one sample pair into the neural network, and outputting a bounding box for the target object in the frame under detection in the at least one sample pair by using the method of detecting target object described in any of the above embodiments; wherein each sample pair includes a reference frame and a frame under detection that correspond to each other; and taking the output bounding box for the target object in the frame under detection as a predicted bounding box and training the neural network and the detector according to the label information and the predicted bounding box.

In addition, various programs and data required for the operation of the device can also be stored in the RAM. The CPU, ROM and RAM are connected to each other via a bus. In a case that there is a RAM, ROM is an optional module. The RAM stores executable instructions, or writes executable instructions into the ROM during operation, and the executable instructions enable the processor to perform operations corresponding to any of the above-mentioned methods of the present disclosure. The input/output (I/O) interface is also connected to the bus. The communication unit can be integrated, or can be configured to have multiple sub-modules (such as multiple IB network cards) and linked to the bus link.

The following components are connected to the I/O interface: an inputting component such as keyboard, mouse, etc.; an outputting component such as cathode ray tube (CRT), liquid crystal display (LCD), and the like and speakers, etc.; a storage component such as hard disk, etc.; and a communication component of the network interface card such as LAN card and modem. The communication component performs communication processing via a network such as the Internet. A driver is also connected to the I/O interface as needed. Removable media, such as magnetic disks, optical disks, magneto-optical disks, semiconductor memories, etc., are installed on the driver as needed, so that the computer program read from it can be installed into the storage component as needed.

It should be noted that the architecture illustrated in FIG. 12 is just an optional implementation, and in the specific practice process, the number and the types of components in FIG. 12 can be selected, deleted, added or replaced according to actual requirements; for different functional components, they may be implemented in a separate manner or in an integrated manner. For example, the GPU and the CPU can be provided separately or the GPU can be integrated on the CPU, the communication component can be provided separately or integrated on the CPU or GPU, and so on. All the alternative embodiments fall into the protection scope of the present disclosure.

In particular, according to an embodiment of the present disclosure, the process described above with reference to the flowchart can be implemented as a computer software program. For example, the embodiments of the present disclosure include a computer program product, which includes a computer program tangibly contained on a machine-readable medium. The computer program includes program code for performing the method illustrated in the flowchart. The program code may include instructions for executing corresponding steps of the method of detecting target object according to the embodiments of the present disclosure. In such an embodiment, the computer program may be downloaded and installed from the network via the communication component, and/or installed from a removable medium. In a case that the computer program is executed by the CPU, the above-mentioned functions defined in the method of the present disclosure are performed.

In addition, the embodiments of the present disclosure further provide a computer program, including computer-readable code. In a case that the computer-readable code is run on a device, a processor of the device executes the computer program for implementing the method of detecting target object according to any of the foregoing embodiments or the method of training target object detection network according to any of the foregoing embodiments.

In addition, embodiments of the present disclosure further provide a computer-readable storage medium for storing computer-readable instructions, which when executed, execute each step of the method of detecting target object according to any of the foregoing embodiments or each step of the method of training target object detection network according to any of the foregoing embodiments.

The various embodiments in this specification are described in a progressive manner, and description of each embodiment focuses on the differences from other embodiments, and the same or similar parts of the various embodiments can be referred to each other. As for the system embodiment, since it substantially corresponds to the method embodiment, the description thereof is relatively simple, and relevant parts can be referred to the description of the method embodiment.

The method and the apparatus according to the present disclosure may be implemented in many ways. For example, the method and the apparatus according to the present disclosure can be implemented by software, hardware, firmware or any combination of software, hardware, and firmware. The above-mentioned sequence of the steps of the method is for illustration only, and the steps of the method of the present disclosure are not limited to the sequence specifically described above, unless otherwise specified. In addition, in some embodiments, the present disclosure may further be implemented as programs recorded in a recording medium, and these programs include machine-readable instructions for implementing the method according to the present disclosure. Thus, the present disclosure further covers a recording medium storing a program for executing the method according to the present disclosure.

The description of the present disclosure is provided for the sake of illustration and description, rather than for exhausting the embodiments of the present disclosure or limiting the present disclosure to what is disclosed. Many modifications and variants are obvious to one of ordinary skill in the art. The embodiments are selected and described to better illustrate the principles and practical applications of the present disclosure, and to enable one of ordinary skill in the art to understand the present disclosure so as to design various embodiments with various modifications suitable for specific purposes.

The invention claimed is:

1. A method of detecting target object, comprising:
   extracting, through a neural network, a feature of a reference frame and a feature of a frame under detection respectively, wherein
      the frame under detection is in a video sequence, subject to detection for a target object,
      the reference frame comprises a bounding box image of the target object, and a detection timing of the reference frame in the video sequence is before that of the frame under detection, and
      an image size of the reference frame is smaller than that of the frame under detection;
   inputting each of at least two feature groups output from at least two network layers of the neural network into a detector to obtain a corresponding detection result group output from the detector, wherein
      each of the at least two feature groups comprises the feature of the reference frame and the feature of the frame under detection, and
      each of at least two detection result groups comprises a classification result and a regression result with respect to a plurality of candidate boxes for the target object; and
   determining a bounding box for the target object in the frame under detection according to the at least two detection result groups, by:
      processing classification results of the at least two detection result groups, to obtain a comprehensive classification result with respect to the plurality of candidate boxes;
      processing regression results of the at least two detection result groups, to obtain a comprehensive regression result with respect to the plurality of candidate boxes; and
      acquiring the bounding box for the target object in the frame under detection according to the comprehensive classification result and the comprehensive regression result with respect to the plurality of candidate boxes.

2. The method according to claim 1, further comprising:
   taking the bounding box for the target object in the frame under detection as a next reference frame;
   extracting, through the neural network, a feature of the next reference frame and a feature of a next frame under detection respectively, wherein a timing of the next frame under detection in the video sequence is after that of the frame under detection;
   inputting at least two next feature groups output from the at least two network layers of the neural network into the detector to respectively obtain at least two next detection result groups output from the detector, wherein each of the at least two next feature groups comprises a feature of the next reference frame and a feature of the next frame under detection; and
   determining, according to the at least two next detection result groups, a bounding box for the target object in the next frame under detection.

3. The method according to claim 1, wherein
   the neural network comprises a plurality of convolution layers; and inputting the at least two feature groups output from the at least two network layers of the neural network into the detector, comprises: inputting at least two feature groups output from at least two convolution layers of the neural network into the detector respectively; or
   the neural network comprises a plurality of convolution blocks, and each convolution block comprises at least one convolution layer; and inputting the at least two feature groups output from the at least two network layers of the neural network into the detector, comprises: inputting at least two feature groups output from at least two convolution blocks of the neural network into the detector respectively; or
   the neural network comprises at least one convolution block and at least one convolution layer, and each of the at least one convolution block comprises at least one convolution layer; and inputting the at least two feature groups output from the at least two network layers of the neural network into the detector, comprises: inputting at least two feature groups output from the at least one convolution block of the neural network and from the at least one convolution layer of the neural network into the detector.

4. The method according to claim 1, further comprising:
   cutting an area image for detection of the target object from the frame under detection, wherein, at least one of a length and a width of the area image is greater than that of the reference frame, and the area image is centered at a center point of the reference frame.

5. The method according to claim 1, wherein inputting each of the at least two feature groups output from the at least two network layers of the neural network into the detector to obtain a corresponding detection result group output from the detector, comprises:
   acquiring, based on the feature of the reference frame, a classification weight and a regression weight for the detector; and
   processing the feature of the frame under detection with the classification weight and the regression weight, to obtain to output a classification result and a regression result with respect to each of the plurality of candidate boxes from the detector.

6. The method according to claim 5, wherein
   acquiring, based on the feature of the reference frame, the classification weight for the detector comprises:
      performing, through a first convolution layer of the neural network, a $1^{st}$ convolution operation on the feature of the reference frame, and taking a first feature obtained through the $1^{st}$ convolution operation as the classification weight for the detector;

acquiring, based on the feature of the reference frame, the regression weight for the detector comprises:

performing, through a second convolution layer of the neural network, a $2^{nd}$ convolution operation on the feature of the reference frame, and taking a second feature obtained through the $2^{nd}$ convolution operation as the regression weight for the detector;

processing the feature of the frame under detection with the classification weight and the regression weight, to output the classification result and the regression result with respect to each of the plurality of candidate boxes form the detector comprises:

performing, with the classification weight, a $3^{rd}$ convolution operation on the feature of the frame under detection to obtain a classification result with respect to each of the plurality of candidate boxes; and performing, with the regression weight, a $4^{th}$ convolution operation on the feature of the frame under detection to obtain a regression result with respect to each of the plurality of candidate boxes;

performing, with the classification weight, the $3^{rd}$ convolution operation on the feature of the frame under detection to obtain the classification result with respect to each of the plurality of candidate boxes comprises:

performing, through a third convolution layer of the detector, a $5^{th}$ convolution operation on the feature of the frame under detection to obtain a third feature, a number of channels of the third feature is identical to a number of channels of the feature of the frame under detection; and performing, with the classification weight, a $6^{th}$ convolution operation on the third feature to obtain the classification result with respect to each of the plurality of candidate boxes; and performing, with the regression weight, the $4^{th}$ convolution operation on the feature of the frame under detection to obtain a regression result with respect to each of the plurality of candidate boxes comprises:

performing, through a fourth convolution layer of the detector, a $7^{th}$ convolution operation on the feature of the frame under detection to obtain a fourth feature, a number of channels of the fourth feature is identical to a number of channels of the feature of the frame under detection; and performing, with the regression weight, an $8^{th}$ convolution operation on the fourth feature to obtain the regression result with respect to each of the plurality of candidate boxes.

7. The method according to claim 5, wherein acquiring, based on the feature of the reference frame, the classification weight for the detector comprises:

performing, through a fifth convolution layer of the detector, a $9^{th}$ convolution operation on the feature of the reference frame, and taking L fifth features obtained through the $9^{th}$ convolution operation as the classification weight for the detector, wherein a number of channels of the feature of the reference frame is M1, a number of channels of the fifth feature is N1, wherein each of M1, N1, and L is an integer greater than 0, and M1 is greater than N1;

processing the feature of the frame under detection with the classification weight to output the classification results with respect to each of the plurality of candidate boxes from the detector comprises:

performing, through a sixth convolution layer of the detector, a $10^{th}$ convolution operation on the feature of the frame under detection to obtain L sixth features with L channels, wherein a number of channels of the feature of the frame under detection is M2, which is an integer greater than 0 and is greater than N1;

performing, with each of the L fifth features of the classification weight, a $11^{th}$ convolution operation on a corresponding feature of the L sixth features, respectively, to obtain L convolution results; and performing, through a seventh convolution layer of the detector, a $12^{th}$ convolution operation on the L convolution results to obtain the classification result with respect to each of the plurality of candidate boxes;

acquiring the regression weight for the detector based on the feature of the reference frame comprises:

performing, through an eighth convolution layer of the detector, a $13^{th}$ convolution operation on the feature of the reference frame, and taking eighth features with P channels obtained through the $13^{th}$ convolution operation as the regression weight for the detector; wherein the number of channels of the feature of the reference frame is M1, the number of channels of an eighth feature is N2, each of M1, N2, and P is an integer greater than 0, and M1 is greater than N2; and processing the feature of the frame under detection with the regression weight, to obtain the regression result with respect to each of the plurality of candidate boxes output from the detector comprises:

performing, through a ninth convolution layer of the detector, a $14^{th}$ convolution operation on the feature of the frame under detection, to obtain P ninth features with N2 channels, wherein the number of channels of the feature of the frame under detection is M2, which is an integer greater than 0 and is greater than N2;

performing, with each of the P eighth features of the regression weight, a $15^{th}$ convolution operation on a corresponding feature of the P ninth features, to obtain P convolution results; and performing, through a tenth convolution layer of the detector, a $16^{th}$ convolution operation on the P convolution results, to obtain the regression result with respect to each of the plurality of candidate boxes.

8. The method according to claim 7, wherein after obtaining the L convolution results, the method further comprises connecting the L convolution results; and performing, through the seventh convolution layer of the detector, the $12^{th}$ convolution operation on the L convolution results comprises:

performing, through the seventh convolution layer of the detector, a convolution operation on the connected L convolution results; and after obtaining the P convolution results, the method further comprises connecting the P convolution results, and performing, through the tenth convolution layer of the detector, the $16^{th}$ convolution operation on the P convolution results comprises:

performing, through the tenth convolution layer of the detector, a convolution operation on the connected P convolution results.

9. The method according to claim 1, wherein
processing classification results of the at least two detection result groups, to obtain a comprehensive classification result with respect to the plurality of candidate boxes comprises:
performing one of weighting, averaging, and weighted-averaging on the classification results with respect to the at least two detection result groups to obtain the comprehensive classification result with respect to the plurality of candidate boxes; and/or
processing regression results of the at least two detection result groups, to obtain a comprehensive regression result with respect to the plurality of candidate boxes comprises:
performing one of weighting, averaging, and weighted-averaging on the regression results with respect to the at least two detection result groups, to obtain the comprehensive regression result with respect to the plurality of candidate boxes;
acquiring the bounding box for the target object in the frame under detection according to the comprehensive classification result and the comprehensive regression result with respect to the plurality of candidate boxes comprises:
selecting a candidate box from the plurality of candidate boxes according to the comprehensive classification result and the comprehensive regression result with respect to the plurality of candidate boxes, and performing regression on the selected candidate box according to an offset of the comprehensive regression result with respect to the selected candidate box to obtain the bounding box for the target object in the frame under detection; and
selecting the candidate box from the plurality of candidate boxes according to the comprehensive classification result and the comprehensive regression result with respect to the plurality of candidate boxes comprises:
selecting the candidate box from the plurality of candidate boxes according to a weight coefficient for the comprehensive classification result and a weight coefficient for the comprehensive regression result.

10. The method according to claim 9, wherein, after obtaining the comprehensive regression result with respect to the plurality of candidate boxes, the method further comprises: adjusting the comprehensive classification result according to the comprehensive regression result with respect to the plurality of candidate boxes;
selecting the candidate box from the plurality of candidate boxes according to the comprehensive classification result and the comprehensive regression result with respect to the plurality of candidate boxes comprises:
selecting the candidate box from the plurality of candidate boxes according to the adjusted comprehensive classification result.

11. The method according to claim 1, further comprising at least one of the following:
labeling, after acquiring the bounding box for the target object in the frame under detection, the bounding box for the target object in the video sequence; or
determining, after acquiring bounding boxes for the target object in a plurality of frames in the video sequence, a movement trajectory of the target object in the video sequence according to positions of the bounding boxes for the target object in the plurality of frames in the video sequence; or
adjusting, after acquiring the bounding boxes for the target object in the plurality of frames in the video sequence, shooting parameters of a camera according to position of the bounding box for the target object; or
determining, after acquiring the bounding box for the target object in the frame under detection, whether a position of the bounding box for the target object in the frame under detection is within a preset area; and output a prompt message in response to the position of the bounding box for the target object within the preset area; or
matching, in a case that there are a plurality of target objects, after acquiring bounding boxes for the plurality of target objects in the frame under detection, the plurality of target objects in the frame under detection with the bounding boxes for the plurality of target objects in the reference frame, and labeling an identification for each of the plurality of target objects in the frame under detection according to a matching result and the identification of each of the plurality of target object in the reference frame; or
determining, in a case that there are a plurality of target objects, after acquiring bounding boxes for the plurality of target objects in multiple frames in the video sequence, movement trajectories of the plurality of target objects in the video sequence according to positions of the bounding boxes for each of the plurality of target objects in the multiple frames in the video sequence; and tracking the plurality of target objects according to the movement trajectories of the plurality of target objects in the video sequence; or
analyzing, in a case that there are a plurality of target objects, after acquiring bounding boxes for the plurality of target objects in multiple frames in the video sequence, behaviors of the plurality of target objects according to changes in a number and/or positions of the plurality of target objects in the multiple frames in the video sequence; or
determining, after acquiring the bounding boxes for the target object in multiple frames in the video sequence, a motion state of the target object according to positions of the bounding box for the target object in the multiple frames in the video sequence, and, performing intelligent driving control on a carrier carrying a camera shooting the video sequence based on the motion state of the target object and a motion state of the carrier.

12. The method according to claim 11, wherein the carrier comprises a vehicle, a robot, or an aircraft; and performing intelligent driving control on the carrier comprises at least one of the following: planning a route for the carrier, or controlling the motion state or a driving mode of the carrier.

13. An electronic apparatus, comprising:
memory, configured to store a computer program; and
a processor, configured to execute the computer program stored in the memory, and to implement operations when the computer program is executed, wherein the operations comprise:
extracting, through a neural network, a feature of a reference frame and a feature of a frame under detection respectively, wherein
the frame under detection is in a video sequence, subject to detection for a target object,
the reference frame comprises a bounding box image of the target object, and a detection timing of the reference frame in the video sequence is before that of the frame under detection, and
an image size of the reference frame is smaller than that of the frame under detection;

inputting each of at least two feature groups output from at least two network layers of the neural network into a detector to obtain a corresponding detection result group output from the detector, wherein
- each of the at least two feature groups comprises the feature of the reference frame and the feature of the frame under detection, and
- each of at least two detection result groups comprises a classification result and a regression result with respect to a plurality of candidate boxes for the target object; and determining a bounding box for the target object in the frame under detection according to the at least two detection result groups, by:
- processing classification results of the at least two detection result groups, to obtain a comprehensive classification result with respect to the plurality of candidate boxes;
- processing regression results of the at least two detection result groups, to obtain a comprehensive regression result with respect to the plurality of candidate boxes; and
- acquiring the bounding box for the target object in the frame under detection according to the comprehensive classification result and the comprehensive regression result with respect to the plurality of candidate boxes.

14. The electronic apparatus according to claim 13, wherein the operations further comprises:
- taking the bounding box for the target object in the frame under detection as a next reference frame;
- extracting, through the neural network, a feature of the next reference frame and a feature of a next frame under detection respectively, wherein a timing of the next frame under detection in the video sequence is after that of the frame under detection;
- inputting at least two next feature groups output from the at least two network layers of the neural network into the detector to respectively obtain at least two next detection result groups output from the detector, wherein each of the at least two next feature groups comprises a feature of the next reference frame and a feature of the next frame under detection; and
- determining, according to the at least two next detection result groups, a bounding box for the target object in the next frame under detection.

15. The electronic apparatus according to claim 13, wherein
the neural network comprises a plurality of convolution layers; and inputting the at least two feature groups output from the at least two network layers of the neural network into the detector, comprises: inputting at least two feature groups output from at least two convolution layers of the neural network into the detector respectively; or
the neural network comprises a plurality of convolution blocks, and each convolution block comprises at least one convolution layer; and inputting the at least two feature groups output from the at least two network layers of the neural network into the detector, comprises: inputting at least two feature groups output from at least two convolution blocks of the neural network into the detector respectively; or
the neural network comprises at least one convolution block and at least one convolution layer, and each of the at least one convolution block comprises at least one convolution layer; and inputting the at least two feature groups output from the at least two network layers of the neural network into the detector, comprises: inputting at least two feature groups output from the at least one convolution block of the neural network and from the at least one convolution layer of the neural network into the detector.

16. The electronic apparatus according to claim 13, wherein the operations further comprise:
cutting an area image for detection of the target object from the frame under detection, wherein, at least one of a length and a width of the area image is greater than that of the reference frame, and the area image is centered at a center point of the reference frame.

17. The electronic apparatus according to claim 13, wherein inputting each of the at least two feature groups output from the at least two network layers of the neural network into the detector to obtain a corresponding detection result group output from the detector, comprises:
- acquiring, based on the feature of the reference frame, a classification weight and a regression weight for the detector; and
- processing the feature of the frame under detection with the classification weight and the regression weight, to output a classification result and a regression result with respect to each of the plurality of candidate boxes from the detector.

18. The electronic apparatus according to claim 17, wherein
acquiring, based on the feature of the reference frame, the classification weight for the detector comprises:
- performing, through a first convolution layer of the neural network, a $1^{st}$ convolution operation on the feature of the reference frame, and taking a first feature obtained through the $1^{st}$ convolution operation as the classification weight for the detector;

acquiring, based on the feature of the reference frame, the regression weight for the detector comprises:
- performing, through a second convolution layer of the neural network, a $2^{nd}$ convolution operation on the feature of the reference frame, and taking a second feature obtained through the $2^{nd}$ convolution operation as the regression weight for the detector;

processing the feature of the frame under detection with the classification weight and the regression weight, to output the classification result and the regression result with respect to each of the plurality of candidate boxes form the detector comprises:
- performing, with the classification weight, a $3^{rd}$ convolution operation on the feature of the frame under detection to obtain a classification result with respect to each of the plurality of candidate boxes; and
- performing, with the regression weight, a $4^{th}$ convolution operation on the feature of the frame under detection to obtain a regression result with respect to each of the plurality of candidate boxes;

performing, with the classification weight, the $3^{rd}$ convolution operation on the feature of the frame under detection to obtain the classification result with respect to each of the plurality of candidate boxes comprises:
- performing, through a third convolution layer of the detector, a $5^{th}$ convolution operation on the feature of the frame under detection to obtain a third feature, a number of channels of the third feature is identical to a number of channels of the feature of the frame under detection; and
- performing, with the classification weight, a $6^{th}$ convolution operation on the third feature to obtain the classification result with respect to each of the plurality of candidate boxes; and performing, with the regression weight, the $4^{th}$ convolution operation on the feature of the frame under detection to obtain a regression result with respect to each of the plurality of candidate boxes comprises:
performing, through a fourth convolution layer of the detector, a $7^{th}$ convolution operation on the feature of the frame under detection to obtain a fourth feature, a number of channels of the fourth feature is identical to a number of channels of the feature of the frame under detection; and
performing, with the regression weight, an $8^{th}$ convolution operation on the fourth feature to obtain the regression result with respect to each of the plurality of candidate boxes.

19. The electronic apparatus according to claim 18, wherein
acquiring, based on the feature of the reference frame, the classification weight for the detector comprises:
performing, through a fifth convolution layer of the detector, a $9^{th}$ convolution operation on the feature of the reference frame, and taking L fifth features obtained through the $9^{th}$ convolution operation as the classification weight for the detector, wherein a number of channels of the feature of the reference frame is M1, a number of channels of the fifth feature is N1, wherein each of M1, N1, and L is an integer greater than 0, and M1 is greater than N1;
processing the feature of the frame under detection with the classification weight to output the classification results with respect to each of the plurality of candidate boxes from the detector comprises:
performing, through a sixth convolution layer of the detector, a $10^{th}$ convolution operation on the feature of the frame under detection to obtain L sixth features with L channels, wherein a number of channels of the feature of the frame under detection is M2, which is an integer greater than 0 and is greater than N1;
performing, with each of the L fifth features of the classification weight, a $11^{th}$ convolution operation on a corresponding feature of the L sixth features, respectively, to obtain L convolution results; and
performing, through a seventh convolution layer of the detector, a $12^{th}$ convolution operation on the L convolution results to obtain the classification result with respect to each of the plurality of candidate boxes;
acquiring the regression weight for the detector based on the feature of the reference frame comprises:
performing, through an eighth convolution layer of the detector, a $13^{th}$ convolution operation on the feature of the reference frame, and taking eighth features with P channels obtained through the $13^{th}$ convolution operation as the regression weight for the detector; wherein the number of channels of the feature of the reference frame is M1, the number of channels of an eighth feature is N2, each of M1, N2, and P is an integer greater than 0, and M1 is greater than N2; and
processing the feature of the frame under detection with the regression weight, to obtain the regression result with respect to each of the plurality of candidate boxes output from the detector comprises:
performing, through a ninth convolution layer of the detector, a $14^{th}$ convolution operation on the feature of the frame under detection, to obtain P ninth features with N2 channels, wherein the number of channels of the feature of the frame under detection is M2, which is an integer greater than 0 and is greater than N2;
performing, with each of the P eighth features of the regression weight, a $15^{th}$ convolution operation on a corresponding feature of the P ninth features, to obtain P convolution results; and
performing, through a tenth convolution layer of the detector, a $16^{th}$ convolution operation on the P convolution results, to obtain the regression result with respect to each of the plurality of candidate boxes.

20. A non-transitory computer readable storage medium, having a computer program stored thereon, wherein in a case that the computer program is executed by a processor, the processor implements operations comprising:
extracting, through a neural network, a feature of a reference frame and a feature of a frame under detection respectively, wherein
the frame under detection is in a video sequence, subject to detection for a target object,
the reference frame comprises a bounding box image of the target object, and a detection timing of the reference frame in the video sequence is before that of the frame under detection, and
an image size of the reference frame is smaller than that of the frame under detection;
inputting each of at least two feature groups output from at least two network layers of the neural network into a detector to obtain a corresponding detection result group output from the detector, wherein
each of the at least two feature groups comprises the feature of the reference frame and the feature of the frame under detection, and
each of at least two detection result groups comprises a classification result and a regression result with respect to a plurality of candidate boxes for the target object; and
determining a bounding box for the target object in the frame under detection according to the at least two detection result groups, by:
processing classification results of the at least two detection result groups, to obtain a comprehensive classification result with respect to the plurality of candidate boxes;
processing regression results of the at least two detection result groups, to obtain a comprehensive regression result with respect to the plurality of candidate boxes; and
acquiring the bounding box for the target object in the frame under detection according to the comprehensive classification result and the comprehensive regression result with respect to the plurality of candidate boxes.

* * * * *